(12) United States Patent
Hirota et al.

(10) Patent No.: US 9,297,287 B2
(45) Date of Patent: Mar. 29, 2016

(54) EXHAUST GAS CONTROL APPARATUS AND CONTROL METHOD FOR EXHAUST GAS CONTROL APPARATUS

(75) Inventors: Shinya Hirota, Susono (JP); Shunsuke Toshioka, Susono (JP); Akira Mikami, Susono (JP); Koichiro Fukuda, Numazu (JP); Sakutaro Hoshi, Kariya (JP); Takashi Endo, Kariya (JP); Ryoichi Hibino, Nagoya (JP); Matsuei Ueda, Nisshin (JP); Akihiko Asano, Nisshin (JP); Takafumi Yamauchi, Seto (JP); Akira Shichi, Nisshin (JP); Makoto Koike, Toyota (JP); Masatoshi Maruyama, Nagoya (JP); Masakazu Sakata, Obu (JP)

(73) Assignees: TOYOTA JIDOSHA KABUSHIKI KAISHA, Aichi-Ken (JP); DENSO CORPORATION, Aichi-Ken (JP); KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 160 days.

(21) Appl. No.: 13/824,856
(22) PCT Filed: Sep. 21, 2011
(86) PCT No.: PCT/IB2011/002188
§ 371 (c)(1),
(2), (4) Date: Jun. 4, 2013
(87) PCT Pub. No.: WO2012/038807
PCT Pub. Date: Mar. 29, 2012

(65) Prior Publication Data
US 2013/0247543 A1 Sep. 26, 2013

(30) Foreign Application Priority Data
Sep. 22, 2010 (JP) .................................. 2010-212866

(51) Int. Cl.
F01N 3/00 (2006.01)
F01N 3/08 (2006.01)
F01N 3/20 (2006.01)
(52) U.S. Cl.
CPC *F01N 3/08* (2013.01); *F01N 3/208* (2013.01); *F01N 2560/026* (2013.01);
(Continued)

(58) Field of Classification Search
CPC ..... F01N 3/08; F01N 3/208; F01N 2560/026; F01N 2560/06; F01N 2610/02; F01N 2610/146; F01N 2900/0406; F01N 2900/1402; F01N 2900/1602; F01N 2900/1616; F01N 2900/1622; Y02T 10/24
USPC ........... 60/274, 282, 285, 286, 287, 301, 299, 60/297
See application file for complete search history.

(56) References Cited

U.S. PATENT DOCUMENTS

2003/0182935 A1* 10/2003 Kawai et al. .................... 60/286
2007/0125071 A1* 6/2007 Westerberg .................... 60/286
(Continued)

FOREIGN PATENT DOCUMENTS

| JP | A-2003-293737 | 10/2003 |
| JP | A-2010-053703 | 3/2010 |
| JP | A-2010-196623 | 9/2010 |
| WO | WO 2005/068797 A1 | 7/2005 |

*Primary Examiner* — Jesse Bogue
*Assistant Examiner* — Kelsey Stanek
(74) *Attorney, Agent, or Firm* — Oliff PLC

(57) ABSTRACT

An exhaust gas control apparatus includes a control device controlling a urea addition valve for adding urea from an upstream side of a NOx reduction catalyst. The control device obtains an ammonia adsorption amount distribution through the NOx reduction catalyst. When an ammonia adsorption amount in a predetermined part on a downstream side equals or exceeds a predetermined threshold, the control device controls the urea addition valve to stop the urea supply or reduce the amount thereof. The urea addition valve is controlled based on an adsorption amount distribution obtained from a model on which the catalyst is divided into cells such that an ammonia adsorption amount in a first cell positioned furthest upstream equals or exceeds a predetermined threshold close to a saturation adsorption amount and an ammonia adsorption amount in a second cell positioned downstream of the first cell reaches a predetermined target value smaller than the threshold.

24 Claims, 18 Drawing Sheets

(52) U.S. Cl.
CPC ........ *F01N 2560/06* (2013.01); *F01N 2610/02* (2013.01); *F01N 2610/146* (2013.01); *F01N 2900/0406* (2013.01); *F01N 2900/1402* (2013.01); *F01N 2900/1602* (2013.01); *F01N 2900/1616* (2013.01); *F01N 2900/1622* (2013.01); *Y02T 10/24* (2013.01)

(56) References Cited

U.S. PATENT DOCUMENTS

2011/0005203 A1* 1/2011 Gady .............................. 60/276
2011/0005209 A1* 1/2011 Gady et al. ..................... 60/295

* cited by examiner

EXHAUST GAS CONTROL APPARATUS AND CONTROL METHOD FOR EXHAUST GAS CONTROL APPARATUS

INCORPORATION BY REFERENCE

The disclosure of Japanese Patent Application No. 2010-212866 filed on Sep. 22, 2010, including the specification, drawings and abstract is incorporated herein by references in its entirety.

BACKGROUND OF THE INVENTION

1. Field of the Invention

The invention relates to an exhaust gas control apparatus and a control method for an exhaust gas control apparatus.

2. Description of Related Art

A nitrogen oxide (NOx) reduction catalyst that reduces NOx contained in exhaust gas from an internal combustion engine using ammonia as a reducing agent is employed as an exhaust gas control member. In an exhaust gas control apparatus having a NOx reduction catalyst, ammonia is supplied to the NOx reduction catalyst from an upstream side of the NOx reduction catalyst. A method of injecting urea water into the exhaust gas is generally employed as an ammonia supply method.

The urea water injected into the exhaust gas decomposes in the exhaust gas so as to generate ammonia. The ammonia generated from the urea water is adsorbed to the NOx reduction catalyst. A redox reaction is promoted between the ammonia adsorbed to the NOx reduction catalyst and the NOx in the exhaust gas that flows into the NOx reduction catalyst, and as a result, the NOx is removed from the exhaust gas.

A NOx purification rate of the NOx reduction catalyst depends on the amount of ammonia adsorbed to the NOx reduction catalyst. As the amount of ammonia adsorbed by the NOx reduction catalyst increases, a steadily higher NOx purification rate is obtained. There is, however, an upper limit to the amount of ammonia that can be adsorbed to the NOx reduction catalyst, and when an excessive amount of ammonia exceeding the upper limit is supplied to the NOx reduction catalyst, ammonia slip, whereby the ammonia that cannot be adsorbed to the NOx reduction catalyst flows out of the NOx reduction catalyst, becomes more likely to occur.

Hence, in an exhaust gas control apparatus having a NOx reduction catalyst, it is difficult to realize an improvement in the NOx purification rate while suppressing ammonia slip.

In response to this problem, Japanese Patent Application Publication No. 2003-293737 (JP-A-2003-293737) proposes an invention that achieves an improvement in the NOx purification rate while suppressing ammonia slip by calculating an actual ammonia adsorption amount adsorbed by a NOx reduction catalyst on the basis of an ammonia consumption amount consumed by the NOx reduction catalyst and an ammonia addition amount added by a reducing agent supply device, and controlling the ammonia addition amount on the basis of the calculated actual adsorption amount so that the amount of ammonia adsorbed to the NOx reduction catalyst reaches a target adsorption amount.

Even when the amount of ammonia adsorbed to the NOx reduction catalyst remains constant, the NOx purification rate and the likelihood of ammonia slip differ according to a distribution of the ammonia adsorption amount through the NOx reduction catalyst.

For example, immediately after the urea water has been added from the upstream side of the NOx reduction catalyst, the amount of ammonia adsorbed to an upstream side part of the NOx reduction catalyst in an exhaust gas flow direction may be greater than the amount of ammonia adsorbed to a downstream side part. A higher NOx purification rate is obtained when the ammonia adsorption amount is distributed in this manner than when the adsorbed ammonia is distributed uniformly (evenly) throughout the NOx reduction catalyst.

Once a certain amount of time has elapsed following addition of the urea water, on the other hand, the amount of ammonia adsorbed to the downstream side part of the NOx reduction catalyst in the exhaust gas flow direction may become greater than the amount of ammonia adsorbed to the upstream side part. When the ammonia adsorption amount is distributed in this manner, ammonia slip is more likely to occur than when the adsorbed ammonia is distributed uniformly throughout the NOx reduction catalyst.

In the invention described in JP-A-2003-293737, an overall ammonia adsorption amount of the NOx reduction catalyst is simply controlled to the target adsorption amount, and differences in the NOx purification rate and the likelihood of ammonia slip due to the distribution of the ammonia adsorption amount through the NOx reduction catalyst are not taken into account. It may therefore be impossible to realize sufficiently an effect of improving the NOx purification rate while suppressing ammonia slip.

SUMMARY OF THE INVENTION

The invention has been designed in consideration of the points described above, and provides a technique employed in an exhaust gas control apparatus having a NOx reduction catalyst that is provided in an exhaust system of an internal combustion engine in order to reduce and remove NOx contained in exhaust gas using ammonia supplied and adsorbed thereto from an upstream side in an exhaust gas flow direction, with which a NOx purification rate can be improved and ammonia slip can be suppressed.

More generally, the invention provides a technique employed in an exhaust gas control apparatus having an exhaust gas control member that is provided in an exhaust system of an internal combustion engine in order to control exhaust gas using a purifying agent supplied and adsorbed thereto from an upstream side in an exhaust gas flow direction, with which an exhaust gas purification rate can be improved and outflow of the purifying agent from the exhaust gas control member can be suppressed.

An aspect of the invention provides an exhaust gas control apparatus including: an exhaust gas control member that is provided in an exhaust system of an internal combustion engine in order to control an exhaust gas by removing a predetermined component contained in the exhaust gas; a purifying agent supply device that supplies a purifying agent to an upstream side of the exhaust gas control member in the exhaust system so that the purifying agent is adsorbed to the exhaust gas control member and caused to react with the predetermined component in the exhaust gas that passes through the exhaust gas control member; and a control device that obtains a purifying agent adsorption amount distribution through the exhaust gas control member and controls a purifying agent supply supplied by the purifying agent supply device on the basis of the obtained purifying agent adsorption amount distribution.

Another aspect of the invention provides a control method for controlling a purifying agent supply to an exhaust gas flow direction upstream side of an exhaust gas control member that purifies an exhaust gas from an internal combustion engine by adsorbing a purifying agent that reacts with a predetermined component in the exhaust gas, including:

obtaining a purifying agent adsorption amount distribution through the exhaust gas control member; and controlling the purifying agent supply on the basis of the obtained purifying agent adsorption amount distribution.

According to the exhaust gas control apparatus and control method described above, the purifying agent supply supplied by the purifying agent supply device can be controlled while taking into consideration differences in a predetermined component purification rate of the exhaust gas control member corresponding to the purifying agent adsorption amount distribution through the exhaust gas control member and differences in the likelihood of slip, in which the purifying agent flows out of the exhaust gas control member, and therefore an adsorption amount distribution with which the predetermined component purification rate can be improved and an adsorption amount distribution with which purifying agent slip can be suppressed are realized. As a result, the predetermined component purification rate can be increased and purifying agent slip can be suppressed.

For example, even when the amount of purifying agent adsorbed to the entire exhaust gas control member remains constant, the likelihood of purifying agent slip differs according to the purifying agent adsorption amount distribution through the exhaust gas control member. A range in which purifying agent supply control can be performed differs according to the likelihood of purifying agent slip.

For example, when the amount of purifying agent adsorbed to the entire exhaust gas control member remains constant but the adsorption amount is distributed such that purifying agent slip is likely to occur, the purifying agent supply is preferably stopped or reduced, and when the amount of purifying agent adsorbed to the entire exhaust gas control member remains constant but the adsorption amount is distributed such that purifying agent slip is unlikely to occur, the purifying agent supply can be increased while suppressing slip.

According to the exhaust gas control apparatus described above, the purifying agent supply is controlled on the basis of the purifying agent adsorption amount distribution through the exhaust gas control member, and therefore the purifying agent supply can be controlled taking into account the likelihood of purifying agent slip, which differs according to the purifying agent adsorption amount distribution through the exhaust gas control member. As a result, the purifying agent adsorption amount can be increased to a maximum amount within a range where purifying agent slip can be suppressed.

The predetermined component purification rate increases steadily as the amount of purifying agent adsorbed to the exhaust gas control member increases, and therefore, according to this exhaust gas control apparatus, the predetermined component purification rate can be improved while suppressing purifying agent slip.

When the purifying agent adsorbed to the exhaust gas flow direction upstream side part of the exhaust gas control member desorbs, the desorbed purifying agent may slip. However, the desorbed ammonia is more likely to move to the downstream side part of the exhaust gas control member and be consumed in a reaction with the predetermined component therein. In other words, even when the purifying agent adsorption amount in the upstream side part of the exhaust gas control member is large, the effect thereof on the likelihood of slip is small.

When the purifying agent adsorbed to the downstream side part of the exhaust gas control member desorbs, on the other hand, the desorbed purifying agent is highly likely to flow out of the exhaust gas control member into an exhaust passage as is. In other words, the purifying agent adsorbed to the downstream side part of the exhaust gas control member has a greater effect on the likelihood of slip than the purifying agent adsorbed to the upstream side part.

It may therefore be determined that the likelihood of slip is high when the purifying agent adsorption amount in the exhaust gas control member is distributed such that a larger amount of the purifying agent is adsorbed to the downstream side part of the exhaust gas control member.

Hence, in the exhaust gas control apparatus, the purifying agent adsorption amount in a predetermined downstream side part of the exhaust gas control member may be determined on the basis of the purifying agent adsorption amount distribution through the exhaust gas control member, and the purifying agent supply may be controlled on the basis thereof.

More specifically, in the exhaust gas control apparatus, when a purifying agent adsorption amount in a predetermined part of the exhaust gas control member on a downstream side in an exhaust gas flow direction equals or exceeds a predetermined first threshold, the control device may control the purifying agent supply device to stop the purifying agent supply or reduce a purifying agent supply amount.

In so doing, the purifying agent supply can be stopped or reduced when the purifying agent adsorption amount is distributed through the exhaust gas control member such that slip is likely to occur, or in other words when the adsorbed purifying agent is distributed such that a large amount of the purifying agent is adsorbed to the predetermined downstream side part of the exhaust gas control member. As a result, slip can be suppressed favorably.

Conversely, when the purifying agent adsorption amount is distributed through the exhaust gas control member such that slip is unlikely to occur, or in other words when the adsorbed purifying agent is distributed such that a small amount of the purifying agent is adsorbed to the predetermined downstream side part of the exhaust gas control member, the purifying agent supply is not stopped or reduced.

Hence, the purifying agent supply is not stopped or reduced unnecessarily, and therefore a high purification rate can be maintained. In this case, the purifying agent supply can be increased within a range where slip can be suppressed, and in so doing, the purification rate can be increased.

In the related art, the purifying agent supply may be stopped or reduced when an overall purifying agent adsorption amount in the exhaust gas control member is large.

According to the invention, however, even when the overall purifying agent adsorption amount in the exhaust gas control member is large enough for the purifying agent supply to be stopped or reduced in the related art, the purifying agent supply is not stopped or reduced as long as the purifying agent adsorption amount in the predetermined downstream side part of the exhaust gas control member is smaller than the first threshold.

Therefore, a larger amount of purifying agent than that of the related art can be adsorbed to the exhaust gas control member while suppressing purifying agent slip, and as a result, the purification rate can be improved in comparison with the related art.

The "predetermined part" of the above constitution is a region in which slip is highly likely to occur when the purifying agent desorbs from the exhaust gas control member. On a model in which the exhaust gas control member is divided into two parts in the exhaust gas flow direction, for example, a downstream side part may be set as the "predetermined part" of the above constitution.

On a model divided into three or more parts, a part on the downstream side of a part positioned furthest upstream or a part positioned furthest downstream may be set as the "predetermined part" of the above constitution. The "first threshold" should be set appropriately in accordance with the part set as the "predetermined part" of the above constitution.

The "first threshold" is a reference value of the purifying agent adsorption amount in the "predetermined part", and may be set on the basis of an upper limit value of an adsorption amount at which slip does not occur in an amount exceeding a predetermined allowable level, for example.

In the invention, the likelihood of slip may be determined on the basis of the purifying agent adsorption amount distribution through the exhaust gas control member, and the purifying agent supply may be controlled on the basis thereof.

More specifically, in the invention, the control device may obtain a slip determination value, which is an index for determining a likelihood that the purifying agent flows out of the exhaust gas control member, on the basis of the purifying agent adsorption amount distribution through the exhaust gas control member, and when the slip determination value equals or exceeds a predetermined second threshold, the control device may control the purifying agent supply device to stop the purifying agent supply or reduce a purifying agent supply amount.

In so doing, the range of the purifying agent supply control in which slip can be suppressed can be determined more accurately. Therefore, a larger amount of purifying agent can be supplied while suppressing slip more reliably. As a result, suppression of slip and an improvement in the predetermined component purification rate can both be established to a high degree.

The likelihood that when the purifying agent adsorbed to the exhaust gas control member desorbs from the exhaust gas control member, the desorbed purifying agent will flow out of the exhaust gas control member differs according to the position to which the desorbed purifying agent was adsorbed. As described above, desorbed purifying agent that was adsorbed to the downstream side part of the exhaust gas control member is more likely to be a factor in the occurrence of slip than desorbed purifying agent that was adsorbed to the upstream side part.

In other words, when identical amounts of the purifying agent are adsorbed to different positions within the exhaust gas control member, the contribution of the adsorbed purifying agent to the likelihood of slip (the magnitude of a likelihood increasing effect) differs according to the position thereof. Hence, the slip determination value should be calculated taking into consideration not only the adsorption amount distribution through the exhaust gas control member, but also differences in the contribution of the position within the exhaust gas control member to the likelihood of slip.

More specifically, in the above constitution, the control device may obtain a slip probability, which is an index of a likelihood that when the purifying agent adsorbed to the exhaust gas control member desorbs from the exhaust gas control member, the desorbed purifying agent flows out of the exhaust gas control member, in each position of the exhaust gas control member, and may obtain the slip determination value on the basis of the purifying agent adsorption amount distribution through the exhaust gas control member and the slip probability.

The slip probability, although also dependent on the structure, materials, and so on of the exhaust gas control member, is thought to exhibit a basic tendency to increase toward a downstream end of the exhaust gas control member. By determining the slip determination value taking into account the slip probability as well as the purifying agent adsorption amount distribution through the exhaust gas control member, the purifying agent supply can be controlled after determining the likelihood of slip more accurately.

Note that the slip probability employed in the constitution described above, in which the purifying agent supply is controlled in accordance with whether or not the adsorption amount in the predetermined downstream side part of the exhaust gas control member equals or exceeds the first threshold, may be set at 1 in the predetermined part and 0 in other parts.

The upper limit amount of purifying agent that can be adsorbed to the exhaust gas control member may depend on the temperature of the exhaust gas control member. For example, an upper limit amount of ammonia that can be adsorbed to a selective reduction type NOx catalyst tends to decrease steadily as the catalyst temperature increases.

In a situation where the temperature of the exhaust gas flowing into the exhaust gas control member rises, for example when an operating condition of the internal combustion engine shifts greatly to a high load side due to rapid acceleration or processing is performed to oxidize and remove particulate from a particulate filter disposed on the upstream side of the exhaust gas control member, the temperature of the exhaust gas control member may rise, and as a result, the amount of purifying agent that can be adsorbed to the exhaust gas control member may vary. In the case of a selective reduction type NOx catalyst, the amount of adsorbable ammonia decreases.

When the amount of adsorbable purifying agent decreases following a temperature increase, there may not be enough time to perform control for stopping or reducing the purifying agent supply if the temperature increase is rapid, and as a result, an excessive amount of purifying agent may be supplied, causing slip to occur.

A time delay occurs between an increase in the temperature of the exhaust gas flowing into the exhaust gas control member or variation in the operating condition of the internal combustion engine and a point at which the effect thereof actually becomes apparent as an increase in the temperature of the exhaust gas control member. Therefore, by detecting variation in the temperature of the exhaust gas flowing into the exhaust gas control member or variation in the operating condition of the internal combustion engine, it is possible to predict a rapid increase in the temperature of the exhaust gas control member in the near future.

By executing control to stop or reduce the purifying agent supply after making this prediction, a situation in which an excessive amount of the purifying agent is supplied when the temperature of the exhaust gas control member actually increases such that the amount of adsorbable purifying agent decreases can be avoided.

Hence, in the invention, the control device may correct the slip determination value on the basis of at least one of a variation in a temperature of the exhaust gas flowing into the exhaust gas control member and a variation in an operating condition of the internal combustion engine.

In the above constitution, the slip determination value may be corrected in an increasing direction when a rapid increase in the temperature of the exhaust gas control member in the near future is predicted on the basis of at least one of variation in the temperature of the exhaust gas flowing into the exhaust gas control member and variation in the operating condition of the internal combustion engine.

In so doing, the slip determination value is more likely to be determined to equal or exceed the second threshold, and therefore the control for stopping or reducing the purifying agent supply is more likely to be executed. As a result, slip can be suppressed favorably when the operating condition varies in accordance with an increase in the temperature of the exhaust gas control member.

Even when the overall purifying agent adsorption amount in the exhaust gas control member remains constant, the predetermined component purification rate differs according to the purifying agent adsorption amount distribution through the exhaust gas control member. According to the invention, the purifying agent supply is controlled on the basis of the purifying agent adsorption amount distribution through the exhaust gas control member, and therefore the purifying agent supply can be controlled taking into consideration differences in the predetermined component purification rate corresponding to the purifying agent adsorption amount distribution through the exhaust gas control member. As a result, the predetermined component purification rate can be increased to a maximum amount within a range where purifying agent slip can be suppressed.

The predetermined component flows into the exhaust gas control member from an upstream end in the exhaust gas flow direction, and therefore the purification rate is higher with a distribution in which a large amount of the purifying agent is adsorbed to the upstream side part of the exhaust gas control member than with a distribution in which the purifying agent is adsorbed evenly (uniformly) throughout the exhaust gas control member.

As regards the likelihood of slip, meanwhile, slip is more likely to occur with a distribution in which a large amount of the purifying agent is adsorbed to the downstream side part of the exhaust gas control member than with a distribution in which the purifying agent is adsorbed evenly throughout the exhaust gas control member.

In the invention, in consideration of these points, the purification rate may be increased while suppressing slip by controlling the purifying agent supply on the basis of the purifying agent adsorption amount distribution through the exhaust gas control member such that an amount of purifying agent close to a saturation amount is adsorbed to the upstream side part of the exhaust gas control member and a smaller amount of purifying agent is adsorbed to the downstream side part.

More specifically, in the invention, the control device may execute first control for controlling the purifying agent supply supplied by the purifying agent supply device so that a purifying agent adsorption amount in a predetermined first part of the exhaust gas control member reaches or exceeds a predetermined threshold, and second control for controlling the purifying agent supply supplied by the purifying agent supply device so that a purifying agent adsorption amount in a predetermined second part of the exhaust gas control member, located on the downstream side of the first part in the exhaust gas flow direction, reaches a predetermined target value that is equal to or smaller than the threshold.

In the above constitution, the "predetermined threshold" is an adsorption amount in the first part at which a reaction between the purifying agent and the predetermined component is promoted such that the exhaust gas is purified efficiently, and may be set at an upper limit amount (a saturation amount) of the purifying agent that can be adsorbed to the first part or a value in the vicinity of the upper limit amount.

Meanwhile, the "predetermined target value" is an adsorption amount at which desorption of the purifying agent from the second part, leading to slip, can be suppressed favorably, and may be set at an upper limit amount of purifying agent that can be adsorbed to the second part or a smaller value having a margin relative to the upper limit amount.

By performing the first control, an amount of purifying agent close to the saturation amount is adsorbed to the first part on the upstream side of the exhaust gas control member, and therefore a sufficient amount of the purifying agent exists to react with the inflowing predetermined component. Hence, the reaction between the predetermined component flowing into the exhaust gas control member and the purifying agent can be promoted, and as a result, the predetermined component can be removed from the exhaust gas at a high purification rate.

By performing the second control, the purifying agent adsorption amount in the second part is controlled to the predetermined target value, which is sufficiently smaller than the saturation amount, and therefore outflow of the purifying agent to the downstream side from the second part can be suppressed. As a result, slip can be suppressed.

In the above constitution, the control device may execute the first control preferentially over the second control.

The phrase "execute the first control preferentially over the second control" means that the second control is executed in order to achieve the goal of having "the purifying agent adsorption amount in the second part reach the target value" only when the goal of the first control, i.e. "the purifying agent adsorption amount in the first part equals or exceeds the threshold", is reached.

By executing the first control preferentially, the predetermined component purification rate can be increased more reliably.

In the invention, the control device may employ the following method as a method for obtaining the purifying agent adsorption amount distribution through the exhaust gas control member.

For example, the invention may further include: an inflowing component amount acquisition device that obtains an amount of the predetermined component in the exhaust gas flowing into the exhaust gas control member; an outflowing component amount acquisition device that obtains an amount of the predetermined component in the exhaust gas flowing out of the exhaust gas control member; and a temperature acquisition device that obtains a temperature of the exhaust gas control member, wherein the control device may obtain the purifying agent adsorption amount distribution through the exhaust gas control member on the basis of the predetermined component amount obtained by the inflowing component amount acquisition device, the predetermined component amount obtained by the outflowing component amount acquisition device, and the temperature obtained by the temperature acquisition device.

The amount of predetermined component consumed in the exhaust gas control member, and accordingly the amount of purifying agent consumed in the exhaust gas control member, can be estimated from the amount of predetermined component flowing into the exhaust gas control member and the amount of predetermined component flowing out of the exhaust gas control member. The amount of purifying agent that can be adsorbed to the exhaust gas control member can be estimated on the basis of the temperature of the exhaust gas control member.

The purifying agent adsorption amount in the exhaust gas control member can be estimated on the basis of these estimated values together with information indicating the amount of purifying agent supplied by the purifying agent supply device, which is obtained from a control signal generated by the control device or the like, and information relating to the operating condition of the internal combustion engine.

The purifying agent adsorption amount distribution through the exhaust gas control member may be obtained on a model obtained by dividing the exhaust gas control member into a plurality of cells in the exhaust gas flow direction, on the basis of a detected value and/or an estimated value of a purifying agent adsorption amount in each cell.

For example, the purifying agent adsorption amount in each cell may be detected or estimated on the basis of the predetermined component amounts flowing into or out of the exhaust gas control member and each cell, the purifying agent amounts flowing into or out of the exhaust gas control member and each cell, the temperature of the exhaust gas control member and each cell, output values obtained from various sensors in relation to operation control of the internal combustion engine, the purifying agent supply control performed by the purifying agent supply device, and so on, and various information obtained by model calculation, map reference, and so on based thereon.

By attaching sensors for detecting the predetermined component concentration and the purifying agent concentration in positions corresponding to an upstream end and a downstream end of each of the cells set in the exhaust gas control member, the predetermined component amount and purifying agent amount flowing into each cell and the predetermined component amount and purifying agent amount flowing out of each cell can be detected or estimated in accordance with information relating to a flow rate of the exhaust gas that passes through the exhaust gas control member.

The information relating to operation control of the internal combustion engine is constituted by an output value of a sensor that detects an intake air amount, information indicating a control target value relating to fuel injection control, information indicating a control target value of an exhaust gas recirculation (EGR) valve opening in the case of an internal combustion engine having an EGR device, and so on, for example.

For example, in the constitution described above, in which the purifying agent supply is controlled such that the purifying agent adsorption amount in the first part of the exhaust gas control member reaches or exceeds the predetermined threshold close to the saturation adsorption amount and the purifying agent adsorption amount in the second part on the downstream side of the first part reaches the predetermined target value that is smaller than the threshold, the control device may, on a model obtained by dividing the exhaust gas control member into three or more cells in the exhaust gas flow direction, set a first cell positioned furthest upstream as the first part and set a second cell positioned adjacent to the first cell on the downstream side as the second part.

To obtain the purifying agent adsorption amount in the first cell or a region constituted by a group of multiple adjacent cells including the first cell, the invention may further include a component amount sensor that detects a concentration of the predetermined component flowing out of a predetermined cell in the exhaust gas control member, wherein the control device may estimate, on the basis of the purifying agent amount supplied by the purifying agent supply device, a previously estimated purifying agent adsorption amount in a predetermined region constituted by a cell group extending from the first cell positioned furthest upstream within the exhaust gas control member to the predetermined cell, and a purifying agent amount that can be newly adsorbed to the predetermined region, a purifying agent adsorption amount in the predetermined region, estimate a purifying agent consumption amount in the predetermined region on the basis of a predetermined component amount flowing into the exhaust gas control member, estimated from the operating condition of the internal combustion engine, and a predetermined component amount flowing out of the predetermined cell, estimated from a detection value obtained by the component amount sensor, and estimate an actual purifying agent adsorption amount in the predetermined region on the basis of the estimated purifying agent adsorption amount and consumption amount in the predetermined region.

The amount of purifying agent supplied by the purifying agent supply device can be obtained from information relating to the control executed on the purifying agent supply device by the control device. The previously estimated purifying agent adsorption amount in the predetermined region is the amount of purifying agent initially existing in the predetermined region.

The purifying agent amount that can be adsorbed newly to the predetermined region may be estimated on the basis of information indicating the saturation adsorption amount, which corresponds to the temperature of the exhaust gas control member and so on, and information indicating the initially existing purifying agent amount. In other words, when the initially existing purifying agent amount reaches the saturation adsorption amount, purifying agent supplied newly from the purifying agent supply device cannot be adsorbed additionally to the predetermined region.

When the initially existing purifying agent amount is smaller than the saturation adsorption amount, on the other hand, the purifying agent supplied newly from the purifying agent supply device can be adsorbed additionally to the predetermined region.

The predetermined component amount flowing into the exhaust gas control member is an amount of the predetermined component flowing into the predetermined region, and can be estimated on the basis of the flow rate of the exhaust gas flowing into the exhaust gas control member and information relating to combustion in the internal combustion engine (control information relating to a fuel injection amount, a detected value of the intake air amount, and so on).

A difference between the predetermined component amount flowing into the predetermined region and a predetermined component amount flowing out of the predetermined region corresponds to an amount of the predetermined component removed from the predetermined region, and on the basis of the amount of removed predetermined component, the amount of purifying agent consumed in the predetermined region can be estimated.

Hence, using the detection values of the sensors, the purifying agent adsorption amount in the predetermined region can be estimated with a high degree of precision.

To obtain the purifying agent adsorption amount in each cell, the invention may further include: a purifying agent amount sensor that detects a concentration of the purifying agent on either side of the predetermined cell in the exhaust gas control member; and a component amount sensor that detects a concentration of the predetermined component on either side of the predetermined cell, wherein the control device may estimate a difference between purifying agent amounts on either side of the predetermined cell on the basis of a flow rate of the exhaust gas passing through the exhaust gas control member, estimated from the operating condition of the internal combustion engine, and a detection value obtained by the purifying agent amount sensor, estimate a difference between predetermined component amounts on either side of the predetermined cell on the basis of the flow rate of the exhaust gas passing through the exhaust gas control member, estimated from the operating condition of the internal combustion engine, and a detection value obtained by the component amount sensor, estimate a purifying agent amount consumed in the predetermined cell and a purifying agent amount newly adsorbed to the predetermined cell on the basis of the estimated difference between the purifying agent amounts and the estimated difference between the predetermined component amounts on either side of the predetermined cell, and estimate an actual purifying agent adsorption amount in the predetermined cell on the basis of the estimated purifying agent consumption amount and new adsorption amount in the predetermined cell and a previously estimated purifying agent adsorption amount in the predetermined cell.

Estimation of the flow rate of the exhaust gas passing through the exhaust gas control member based on the operating condition of the internal combustion engine may be performed on the basis of information relating to combustion in the internal combustion engine (control information relating to the fuel injection amount, the detected value of the intake air amount, and so on). A difference in the amount of purifying agent passing through a target cell may then be estimated on the basis of the estimated flow rate and the purifying agent concentration on either side of the target cell.

Similarly, a reduction in the amount of predetermined component in the target cell may be estimated on the basis of the flow rate of the exhaust gas passing through the exhaust gas control member and the predetermined component concentration on either side of the target cell.

From the estimated difference in the amount of purifying agent passing through the target cell and reduction in the amount of predetermined component, the amount of purifying agent consumed in the reaction between the purifying agent and the predetermined component in the target cell and the amount of purifying agent adsorbed to the target cell can be estimated. On the basis of these amounts and an amount of purifying agent initially existing in the target cell, a current purifying agent adsorption amount in the target cell can be estimated.

By attaching sensors for estimating the concentration of the purifying agent and sensors for estimating the concentration of the predetermined component on either side of the target cell in this manner, the purifying agent adsorption amount in the target cell can be estimated. Using this method, the purifying agent adsorption amount in each cell can be estimated on a model obtained by dividing the exhaust gas control member into a plurality of cells.

By combining the method of estimating the purifying agent adsorption amount in a region constituted by a group of multiple cells and the method of estimating the purifying agent adsorption amount in each cell, information indicating the purifying agent adsorption amount required in each cell in order to control the purifying agent supply can be obtained.

To obtain the purifying agent adsorption amounts in a first cell positioned furthest upstream and a second cell adjacent thereto, for example, the purifying agent adsorption amount in a region constituted by the first cell and the second cell may be estimated using the method of estimating the purifying agent adsorption amount in a region, and the purifying agent adsorption amount in the first cell may be estimated using the method of estimating the purifying agent adsorption amount in a cell.

The invention described above may be applied to an exhaust gas control apparatus having a NOx reduction catalyst that adsorbs ammonia as a reducing agent and selectively reduces and removes NOx contained in exhaust gas. In this case, the exhaust gas control member of the respective constitutions described above is a NOx reduction catalyst, and the purifying agent is a reducing agent (ammonia) that is adsorbed to the NOx reduction catalyst and performs a redox reaction with the NOx in the exhaust gas that passes through the NOx reduction catalyst. Further, the purifying agent supply device is a device that supplies either ammonia or urea water that decomposes in the exhaust gas to generate ammonia.

The invention may also be considered as a method invention for controlling, in accordance with the aspects described above, a supply of a purifying agent to an exhaust gas flow direction upstream side of an exhaust gas control member that purifies exhaust gas by adsorbing the purifying agent so that the purifying agent reacts with a predetermined component in the exhaust gas. The invention may further be considered as a program for realizing this control method for an exhaust gas control apparatus, a medium on which the program is recorded, and a computer or a system for executing the program.

According to the invention, a NOx purification rate can be improved and ammonia slip can be suppressed in an exhaust gas control apparatus having a NOx reduction catalyst that is provided in an exhaust system of an internal combustion engine in order to reduce and remove NOx contained in exhaust gas using ammonia supplied and adsorbed thereto from an upstream side in an exhaust gas flow direction.

More generally, an exhaust gas purification rate can be improved and outflow of a purifying agent from an exhaust gas control member can be suppressed in an exhaust gas control apparatus having an exhaust gas control member that is provided in an exhaust system of an internal combustion engine in order to control exhaust gas using a purifying agent supplied and adsorbed thereto from an upstream side in an exhaust gas flow direction.

BRIEF DESCRIPTION OF THE DRAWINGS

The features, advantages, and technical and industrial significance of the invention will be described in the following detailed description of example embodiments of the invention with reference to the accompanying drawings, in which like numerals denote like elements, and wherein:

FIGS. 7A, 7B and 7C are views showing a method of determining a likelihood of ammonia slip on the basis of urea addition control according to a second embodiment, wherein FIG. 7A is a view showing an ammonia adsorption amount distribution through the NOx reaction catalyst, FIG. 7B is a view illustrating a slip probability, which is an index of the likelihood that when the ammonia adsorbed to the NOx reduction catalyst desorbs from the NOx reduction catalyst, the desorbed ammonia will flow out of the NOx reduction catalyst into a downstream side exhaust passage, and FIG. 7C is a view illustrating an effective adsorption amount distribution calculated as a product of the adsorption amount distribution and the slip probability;

FIGS. 9A, 9B, 9C and 9D are views showing a method of determining the likelihood of ammonia slip on the basis of urea addition control according to a third embodiment, wherein FIG. 9A shows the ammonia adsorption amount from a catalyst inlet to a catalyst outlet, FIG. 9B shows the slip probability from the catalyst inlet to the catalyst outlet, FIG. 9C shows an effective adsorption rate from the catalyst inlet to the catalyst outlet, and FIG. 9D shows a corrected effective adsorption amount from the catalyst inlet to the catalyst outlet;

FIGS. 13A, 13B and 13C are views showing an example of the ammonia adsorption amount distribution through the NOx reduction catalyst according to the fourth embodiment in terms of the ammonia adsorption rate relative to position, wherein FIG. 13A shows the ammonia adsorption rate in an upstream side part of an exhaust gas flow, FIG. 13B shows an adsorption amount distribution in which the ammonia is adsorbed evenly in an exhaust gas flow direction, and FIG. 13C shows the ammonia adsorption rate in a downstream side part of the exhaust gas flow;

FIGS. 16A and 16B are views showing examples of temporal transitions of the ammonia adsorption rate in a first cell and a second cell of the NOx reduction catalyst and a urea addition amount added by a urea addition valve when the urea addition control according to the fourth embodiment is performed, wherein FIG. 16A shows the temporal transition of the ammonia adsorption rate and FIG. 16B shows the temporal transition of the urea addition amount;

DETAILED DESCRIPTION OF EMBODIMENTS

Embodiments of the invention will be described in detail below. Unless noted otherwise, the technical scope of the invention is not limited to the dimensions, materials, shapes, relative arrangements, and so on of constitutional components described in the embodiments.

Figure 1:
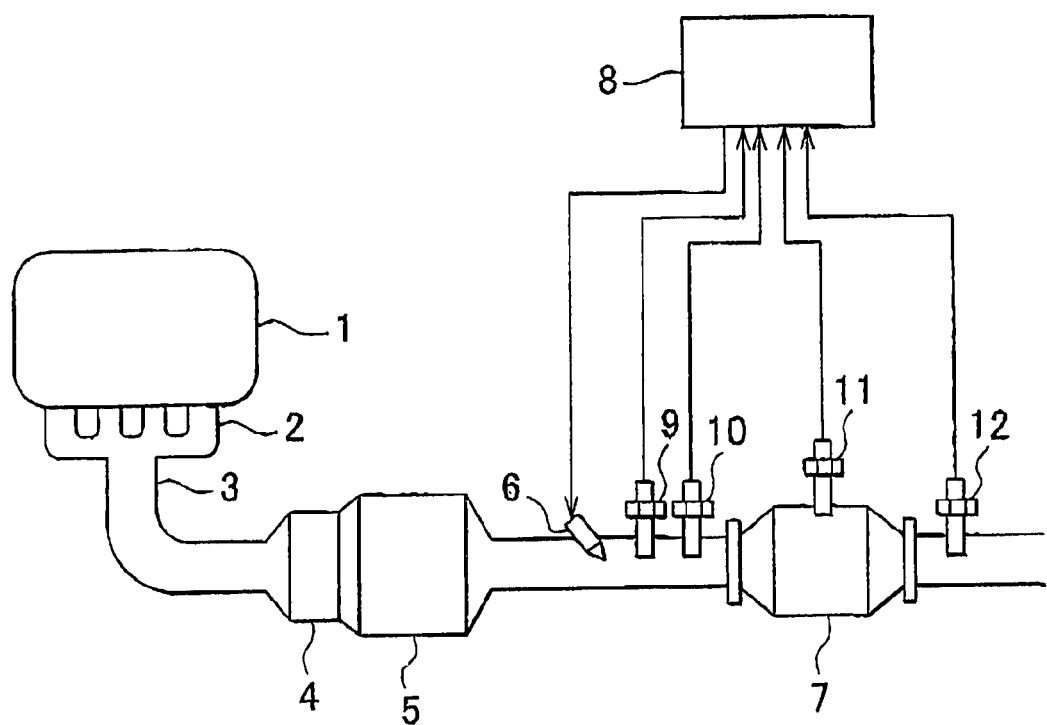
FIG. 1 is a view showing a schematic constitution of an exhaust gas control apparatus for an internal combustion engine according to a first embodiment.

FIG. 1 is a view showing a schematic constitution of an exhaust gas control apparatus for an internal combustion engine according to an embodiment. In FIG. 1, an internal combustion engine 1 is a diesel engine. Gas burned in the internal combustion engine 1 is discharged into an exhaust manifold 2. An exhaust passage 3 is connected to the exhaust manifold 2.

An oxidation catalyst 4, a filter 5 that traps particulate matter contained in the exhaust gas, and a NOx reduction catalyst 7 (exhaust gas control member) that adsorbs ammonia and selectively reduces NOx (a predetermined component) contained in the exhaust gas are provided in the exhaust gas passage 3 in order from an upstream side in an exhaust gas flow direction. A urea addition valve 6 (purifying agent supply device) that adds urea water to the exhaust gas is provided in the exhaust passage 3 on an upstream side of the NOx reduction catalyst 7.

An exhaust gas temperature sensor 9 that detects a temperature of the exhaust gas and a NOx sensor 10 (inflowing component amount acquisition device) that detects a NOx concentration of the exhaust gas are provided in the exhaust passage 3 on the upstream side of the NOx reduction catalyst 7. Further, a catalyst temperature sensor 11 (temperature acquisition device) that detects a temperature of the NOx reduction catalyst 7 is provided in the NOx reduction catalyst 7. A NOx sensor 12 (outflowing component amount acquisition device) that detects the NOx concentration of the exhaust gas is provided the exhaust passage 3 on a downstream side of the NOx reduction catalyst 7.

An electronic control unit (ECU) 8 is a computer that controls operating conditions of the internal combustion engine 1. Detection values from the exhaust gas temperature sensor 9, NOx sensor 10, catalyst temperature sensor 11, NOx sensor 12, and various other sensors not shown in the drawing are input into the ECU 8. The ECU 8 obtains the operating conditions of the internal combustion engine 1 and requests from a driver on the basis of the detection values input from the various sensors, and controls operations of the urea addition valve 6 and various other devices not shown in the drawing on the basis of the obtained operating conditions and requests.

The urea water added to the exhaust gas by the urea addition valve 6 is pyrolyzed and/or hydrolyzed in the exhaust gas such that ammonia is generated. This ammonia is adsorbed to the NOx reduction catalyst 7 and serves as a reducing agent in a redox reaction with the NOx contained in the exhaust gas that passes through the NOx reduction catalyst 7. As a result, the NOx is removed from the exhaust gas, whereby the exhaust gas is purified. A NOx purification rate of the NOx reduction catalyst depends on the amount of ammonia adsorbed to the NOx reduction catalyst.

Figure 2:
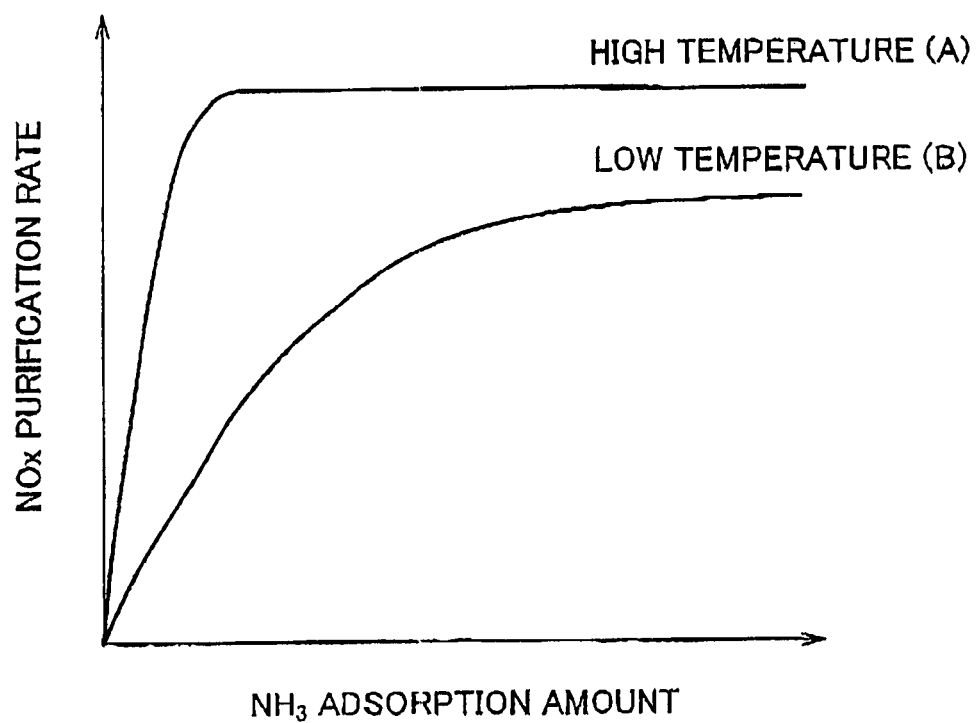
FIG. 2 is view showing a relationship between an ammonia adsorption amount and a NOx purification rate of a NOx reduction catalyst in the exhaust gas control apparatus.

FIG. 2 is a view showing a relationship between the amount of ammonia adsorbed to the NOx reduction catalyst and the NOx purification rate. The abscissa in FIG. 2 shows the amount of ammonia adsorbed to the NOx reduction catalyst, while the ordinate in FIG. 2 shows the NOx purification rate. A solid line A in FIG. 2 shows the relationship between the ammonia adsorption amount and the NOx purification rate in a case where the temperature of the NOx reduction catalyst is comparatively high. A solid line B in FIG. 2 shows the relationship between the ammonia adsorption amount and the NOx purification rate in a case where the temperature of the NOx reduction catalyst is comparatively low.

When the temperature of the NOx reduction catalyst is low, catalytic activity is low, and therefore a speed of the redox reaction between the ammonia and the NOx in the NOx reduction catalyst is low. Further, when the temperature of the NOx reduction catalyst 7 falls, the temperature of the oxidation catalyst 4 disposed on the upstream side of the NOx reduction catalyst 7 in the exhaust gas flow direction is also likely to fall, and therefore activity of an oxidation catalyst is also low. Hence, NO$_2$ is less likely to be generated in the oxidation catalyst, leading to a reduction in an NO$_2$ ratio of the NOx that flows into the NOx reduction catalyst, and as a result, a reaction probability of the NOx reduction reaction in the NOx reduction catalyst decreases.

Hence, by increasing the ammonia adsorption amount in the NOx reduction catalyst when the temperature of the NOx reduction catalyst is low and the NOx purification rate is therefore also low, a density of the ammonia in the catalyst can be increased. As a result, the reaction probability of the NOx reduction reaction can be improved even though the temperature of the NOx reduction catalyst is low.

More specifically, when the temperature of the NOx reduction catalyst is low, the NOx purification rate tends to increase as the ammonia adsorption amount in the NOx reduction catalyst increases. In other words, the NOx purification rate is dependent on the amount of ammonia adsorbed to the NOx reduction catalyst.

Therefore, the NOx purification rate can be improved by increasing the amount of ammonia adsorbed to the NOx reduction catalyst. There is, however, an upper limit to the amount of ammonia that can be adsorbed by the NOx reduction catalyst, and when an excessive amount of ammonia exceeding the upper limit is supplied to the NOx reduction catalyst, ammonia slip, whereby the ammonia that cannot be adsorbed to the NOx reduction catalyst flows out of the NOx reduction catalyst, becomes more likely to occur.

Figure 3:
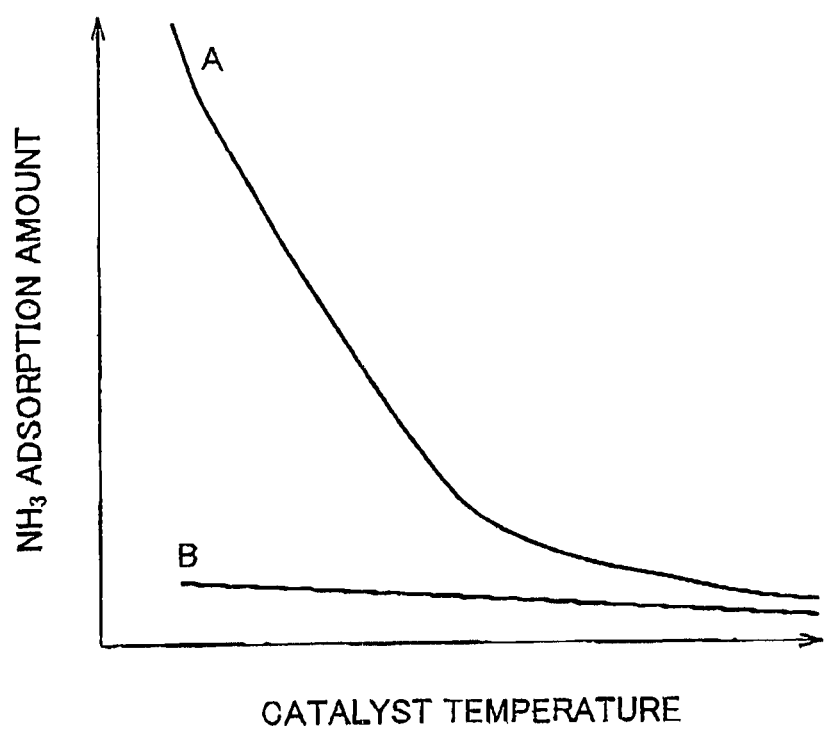
FIG. 3 is a view showing a relationship between a temperature of the NOx reduction catalyst and the amount of ammonia adsorbed to the NOx reduction catalyst in the exhaust gas control apparatus.

An upper limit amount (saturation amount) of ammonia that can be adsorbed by the NOx reduction catalyst is dependent on the temperature of the NOx reduction catalyst. FIG. 3 is a view showing a relationship between the temperature of the NOx reduction catalyst and the amount of ammonia adsorbed to the NOx reduction catalyst. The abscissa in FIG. 3 shows the temperature of the NOx reduction catalyst, while the ordinate in FIG. 3 shows the amount of ammonia adsorbed to the NOx reduction catalyst.

A solid line A in FIG. 3 shows the relationship between the upper limit amount of ammonia that can be adsorbed to the NOx reduction catalyst and the temperature of the NOx reduction catalyst. As shown by the solid line A in FIG. 3, the upper limit amount of adsorbable ammonia tends to decrease as the temperature of the NOx reduction catalyst rises.

In consideration of this tendency, urea addition control may be performed to increase a target value of the ammonia adsorption amount when the temperature of the NOx reduction catalyst is low and reduce the target value of the ammonia adsorption amount when the temperature of the NOx reduction catalyst is high.

However, a vehicle repeatedly accelerates and decelerates in an erratic manner, and therefore, in an exhaust gas control apparatus employed in an internal combustion engine of a vehicle, irregular variation in the catalyst temperature must be taken into account. For example, when the vehicle stops following rapid acceleration from low speed travel, the temperature of the NOx reduction catalyst varies rapidly from a low temperature to a high temperature, leading to a corresponding rapid reduction in the upper limit amount of adsorbable ammonia, and as a result, ammonia slip becomes more likely to occur.

To suppress ammonia slip to an allowable level under various travel conditions, the target value of the ammonia adsorption amount in the NOx reduction catalyst is conventionally limited to an upper limit ammonia adsorption amount at a maximum catalyst temperature envisaged from a travel pattern of the vehicle.

A solid line B in FIG. 3 shows the target value of the ammonia adsorption amount in the NOx reduction catalyst set in the manner described above. The target value indicated by the solid line B is limited to a considerably smaller amount than the upper limit amount of adsorbable ammonia, particularly in a case where the catalyst temperature is low such that the ammonia adsorption amount greatly affects the NOx purification rate, and therefore a problem arises in that a high NOx purification rate cannot be obtained.

Incidentally, the ammonia adsorption amount in the NOx reduction catalyst exhibits bias according to the position within the NOx reduction catalyst and is not always uniform. Immediately after urea addition, for example, the ammonia adsorption amount in an upstream side part of the NOx reduction catalyst in the exhaust gas flow direction may be greater than the ammonia adsorption amount in a downstream side part. When the ammonia adsorption amount is distributed in this manner, a higher NOx purification rate is obtained than when the adsorbed ammonia is distributed uniformly throughout the NOx reduction catalyst.

Once a certain amount of time has elapsed following urea addition, on the other hand, the amount of ammonia adsorbed to the downstream side part of the NOx reduction catalyst in the exhaust gas flow direction may become greater than the amount of ammonia adsorbed to the upstream side part. When the ammonia adsorption amount is distributed in this manner, ammonia slip is more likely to occur than when the adsorbed ammonia is distributed uniformly throughout the NOx reduction catalyst.

Hence, even when the amount of ammonia adsorbed to the entire NOx reduction catalyst remains constant, the NOx purification rate and the likelihood of ammonia slip differ according to the ammonia adsorption amount distribution through the NOx reduction catalyst.

In this embodiment, the distribution of the ammonia adsorption amount in the NOx reduction catalyst 7 is obtained, whereupon urea water addition control (purifying agent supply control) is performed by the urea addition valve 6 on the basis of the ammonia adsorption amount distribution so that a maximum NOx purification rate is obtained while suppressing ammonia slip.

With this urea addition control, a larger amount of ammonia can be adsorbed to the NOx reduction catalyst 7 within a range enabling suppression of ammonia slip, and the ammonia adsorption amount distribution can be set such that ammonia slip can be suppressed and a high NOx purification rate can be obtained.

First, an example of urea addition control according to a first embodiment of the invention, in which the ammonia adsorption amount in a predetermined region of the NOx reduction catalyst 7 is determined from the ammonia adsorption amount distribution through the NOx reduction catalyst 7 and the urea addition control is performed on the basis thereof, will be described.

Figure 4:
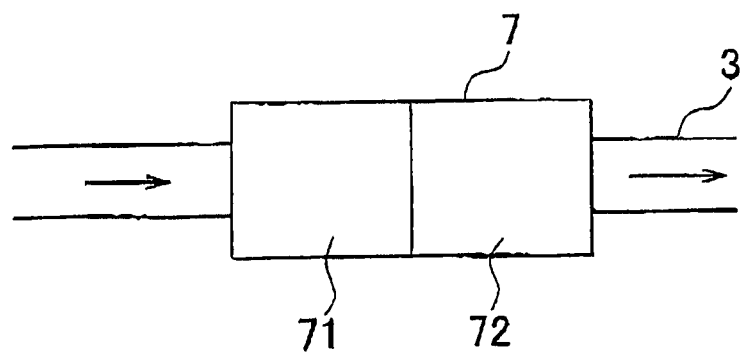
FIG. 4 is a view showing a predetermined region of the NOx reduction catalyst in which an ammonia adsorption amount determination is performed on the basis of urea addition control according to the first embodiment.

In the first embodiment, as shown in FIG. 4, the ammonia adsorption amount distribution through the NOx reduction catalyst 7 is obtained using a model in which the NOx reduction catalyst 7 is divided into two cells. Hereafter, an upstream side part 71 in the exhaust gas flow direction will be referred to as a first cell, and a downstream side part 72 in the exhaust gas flow direction will be referred to as a second cell. In the first embodiment, urea addition control is performed on the basis of the ammonia adsorption amount in the second cell 72.

When ammonia adsorbed to the first cell 71 desorbs from the NOx reduction catalyst 7, the desorbed ammonia may flow out of the NOx reduction catalyst 7, thereby causing ammonia slip. However, the desorbed ammonia is more likely to move through the interior of the NOx reduction catalyst 7 into the second cell 72 and be consumed in a reaction with the NOx in the second cell 72. Therefore, desorption of the ammonia adsorbed to the first cell 71 is unlikely to lead to ammonia slip.

When ammonia adsorbed to the second cell 72 desorbs from the NOx reduction catalyst 7, on the other hand, the desorbed ammonia is highly likely to flow out into the exhaust passage 3 as is. Therefore, desorption of the ammonia adsorbed to the second cell 72 is likely to lead to ammonia slip.

Hence, the likelihood of ammonia slip occurring when the adsorbed ammonia desorbs differs between the first cell 71 and the second cell 72. It may therefore be determined that the likelihood of ammonia slip is high when the ammonia adsorption amount in the NOx reduction catalyst 7 is distributed such that a larger amount of ammonia exists in the second cell 72.

In the first embodiment, therefore, the amount of ammonia adsorbed to the second cell 72 of the NOx reduction catalyst 7 is obtained, and when the ammonia adsorption amount in the second cell 72 equals or exceeds a predetermined first threshold, the urea addition valve 6 is controlled to stop urea water addition or reduce a urea water addition amount.

Hence, when the ammonia adsorption amount in the NOx reduction catalyst 7 is distributed such that a larger amount of ammonia is adsorbed to the second cell 72, it is determined that ammonia slip is likely to occur. Urea addition is then stopped or reduced, and in so doing, ammonia slip can be suppressed.

Conversely, when the ammonia adsorption amount in the NOx reduction catalyst 7 is distributed such that a smaller amount of ammonia is adsorbed to the second cell 72 (i.e. when the adsorption amount in the second cell 72 is smaller than the first threshold), the likelihood of ammonia slip is determined to be low, regardless of a total adsorption amount in the NOx reduction catalyst 7 or the adsorption amount in the first cell 71.

Here, urea addition is not stopped or reduced, and therefore the NOx purification rate can be maintained at a high level. In this case, the amount of added urea can be increased. In so doing, the ammonia adsorption amount can be increased, and as a result, the NOx purification rate can be increased.

In the related art, it may be determined that urea addition is to be stopped or reduced when the overall ammonia adsorption amount in the NOx reduction catalyst is large. According to the first embodiment, however, even when the overall ammonia adsorption amount in the NOx reduction catalyst 7 is large enough for urea addition to be stopped or reduced in the related art, urea addition is not stopped or reduced as long as the ammonia adsorption amount in the second cell 72 is smaller than the first threshold.

Therefore, a larger amount of ammonia than that of the related art can be adsorbed to the NOx reduction catalyst 7 while suppressing ammonia slip, and as a result, the NOx purification rate can be improved.

Figure 5:
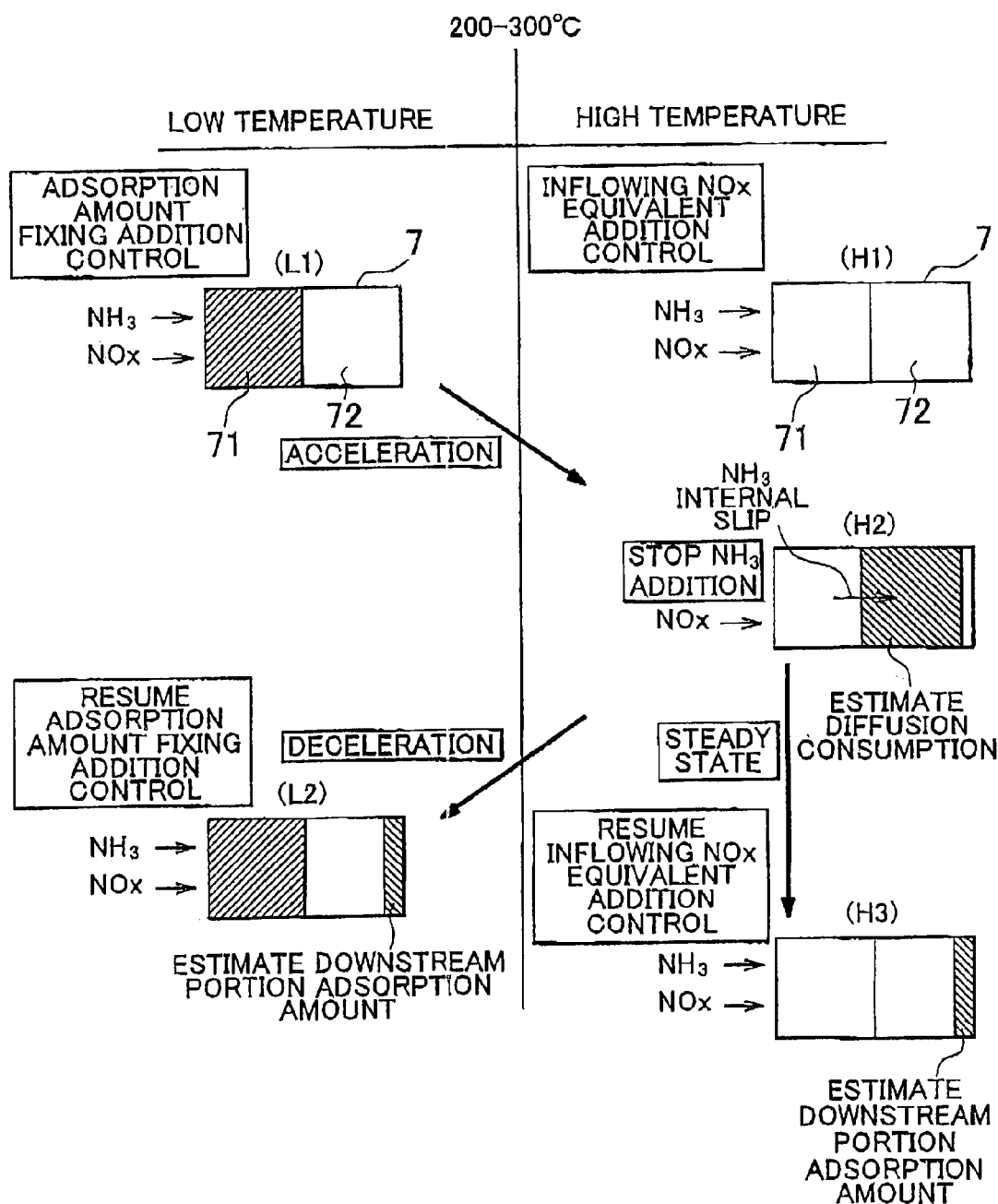
FIG. 5 is a schematic view showing an example of the course of ammonia adsorption in the NOx reduction catalyst when the urea addition control according to the first embodiment is executed.

FIG. 5 is a schematic view showing an example of the course of ammonia adsorption in the NOx reduction catalyst 7 when the urea addition control according to the first embodiment is executed. Here, when the NOx reduction catalyst 7 is at a lower temperature than a predetermined temperature, urea addition (to be referred to hereafter as "adsorption amount fixing control") is performed to align the ammonia adsorption amount in the NOx reduction catalyst 7 with a predetermined target adsorption amount.

Further, when the temperature of the NOx reduction catalyst 7 equals or exceeds the predetermined temperature, urea addition (to be referred to hereafter as "equivalent amount addition control") is performed such that an amount of ammonia that is commensurate with the amount of NOx flowing into the NOx reduction catalyst 7 is supplied to the NOx reduction catalyst 7.

The predetermined temperature is set at a fixed value between approximately 200° C. and 300° C. In FIG. 5, shaded parts of the NOx reduction catalyst 7 represent parts to which ammonia is adsorbed.

In FIG. 5, a state L1 represents a low temperature steady state. In the state L1, the adsorption amount fixing control is performed. As a result, a fixed amount of ammonia is adsorbed mainly to the first cell 71 of the NOx reduction catalyst 7.

In the adsorption amount fixing control, the amount of ammonia adsorbed to the NOx reduction catalyst 7 is estimated by calculating an amount of ammonia consumed by the NOx reduction catalyst 7 from the amount of NOx flowing into the NOx reduction catalyst 7 and an amount of NOx flowing out of the NOx reduction catalyst 7 and calculating an amount of ammonia newly adsorbed to the NOx reduction catalyst 7 using the amount of ammonia flowing into the NOx reduction catalyst 7 and the amount of ammonia flowing out of the NOx reduction catalyst 7.

The urea addition amount added by the urea addition valve 6 is then subjected to feedback control so that the estimated ammonia amount reaches the predetermined target adsorption amount. Alternatively, urea may be added in an amount corresponding to the amount of ammonia consumed by the NOx reduction catalyst 7.

A state H1 represents a high temperature steady state. In the state H1, the equivalent amount addition control is performed. As described above, when the temperature of the NOx reduction catalyst 7 is high, the amount of ammonia adsorbed to the NOx reduction catalyst 7 is small. However, the NOx reduction catalyst 7 exhibits a high degree of activity.

A state H2 represents a high temperature state that is arrived at from the low temperature state L1 as a result of an acceleration transition. In the state H2, the temperature of the NOx reduction catalyst 7 rises in accordance with an increase in the exhaust gas temperature accompanying the acceleration. As a result, the ammonia adsorbed to the first cell 71 moves into the second cell 72.

Accordingly, the ammonia adsorption amount in the second cell 72 increases. When the ammonia adsorption amount in the second cell 72 reaches or exceeds the first threshold, urea addition is stopped. As a result, ammonia slip during acceleration from the low temperature state is suppressed. Note that instead of performing control to stop urea addition, control may be performed to reduce the amount of added urea within a range enabling suppression of ammonia slip.

A state L2 represents a low temperature state established when the vehicle is decelerated to a steady state operation from the high temperature state H2. The temperature of the NOx reduction catalyst 7 decreases in accordance with a reduction in the temperature of the exhaust gas accompanying the deceleration and the steady state operation. The ammonia adsorbed to the second cell 72 is consumed in the reaction with the NOx, and therefore the ammonia adsorption amount in the second cell 72 decreases.

When the ammonia adsorption amount in the second cell 72 falls below the first threshold, urea addition (the adsorption amount fixing control) is resumed. As a result, the NOx purification rate can be improved during deceleration from a high temperature state. When an acceleration transition occurs from the low temperature state L2, the high temperature state H2 described above is established.

A state H3 represents a steady state in which a high temperature state is established continuously for a certain period from the state H2. In the state H3, the ammonia adsorbed to the second cell 72 is consumed in the reaction with the NOx, and therefore the ammonia adsorption amount in the second cell 72 decreases.

When the ammonia adsorption amount in the second cell 72 falls below the first threshold, urea addition (the equivalent amount addition control) is resumed. As a result, the NOx purification rate can be improved in a case where a high load operation continues for a certain period following an acceleration transition.

Figure 6:
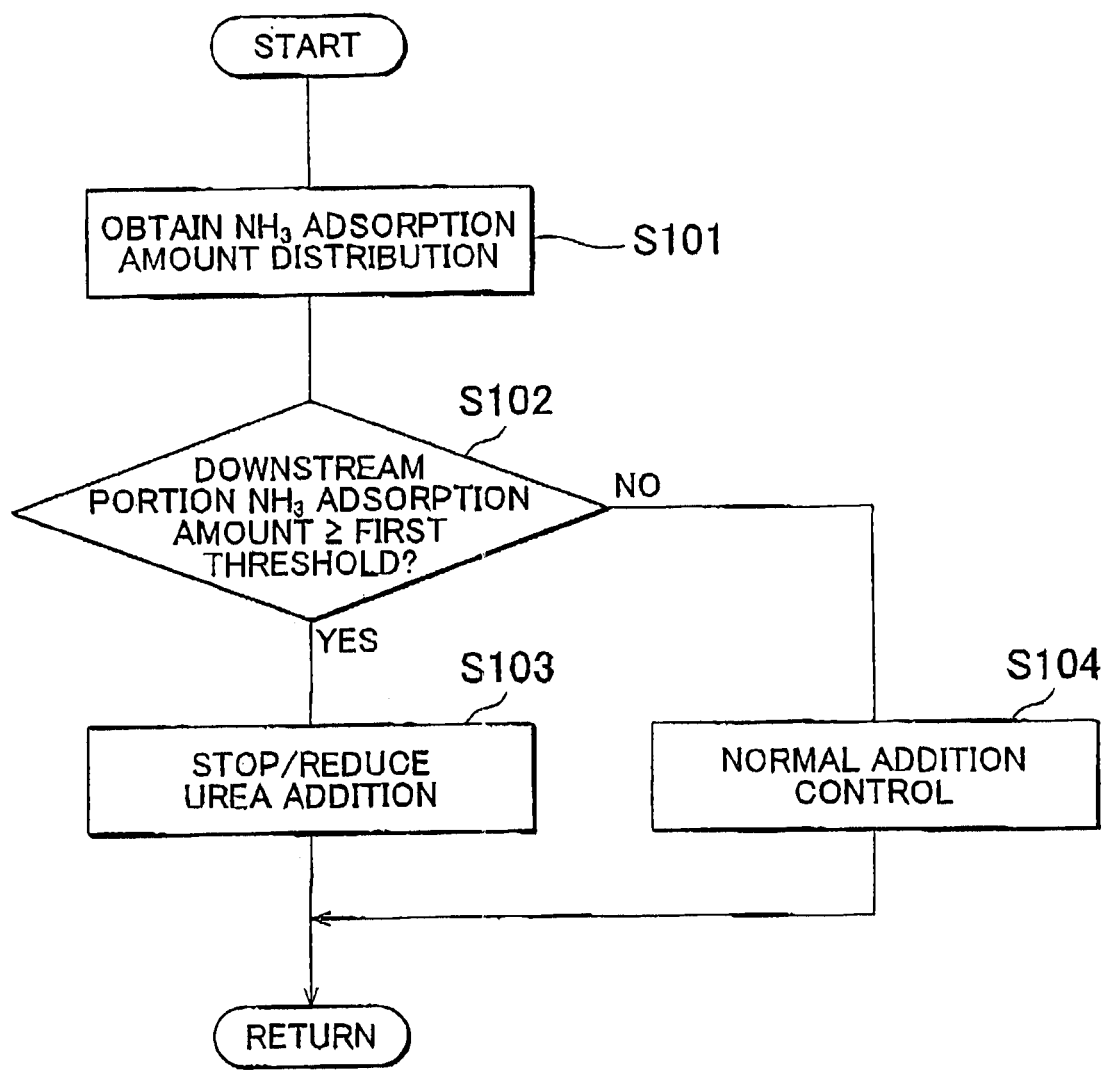
FIG. 6 is a flowchart illustrating the urea addition control according to the first embodiment.

FIG. 6 is a flowchart illustrating the urea addition control according to the first embodiment. The processing illustrated in the flowchart is executed periodically by the ECU 8.

First, in Step S101, the ECU 8 obtains the ammonia adsorption amount distribution through the NOx reduction catalyst 7. The ECU 8 estimates the ammonia adsorption amount distribution through the NOx reduction catalyst 7 on the basis of the temperature of the exhaust gas flowing into the NOx reduction catalyst 7, detected by the exhaust gas temperature sensor 9, the NOx concentration of the exhaust gas flowing into the NOx reduction catalyst 7, detected by the NOx sensor 10, the NOx concentration of the exhaust gas that flows out of the NOx reduction catalyst 7, detected by the NOx sensor 12, the temperature of the NOx reduction catalyst 7, detected by the catalyst temperature sensor 11, the amount of urea added by the urea addition valve 6, and various amounts indicating the operating conditions of the internal combustion engine 1, such as an air amount, a rotation speed, and a fuel injection amount of the internal combustion engine 1, detected by an air flow meter, a crank angle sensor, and so on, not shown in the drawings.

In the first embodiment, estimating the ammonia adsorption amount in the second cell 72 of the NOx reduction catalyst 7 corresponds to obtaining the ammonia adsorption amount distribution through the NOx reduction catalyst 7.

In Step S102, the ECU 8 determines whether or not the ammonia adsorption amount in the second cell 72 obtained in Step S101 is equal to or greater than the predetermined first threshold. The first threshold is a reference value of the ammonia adsorption amount in the second cell 72, and may be determined on the basis of an upper limit value of the ammonia adsorption amount at which the amount of ammonia flowing out of the NOx reduction catalyst 7 to the downstream side due to ammonia slip does not exceed a predetermined allowable level, for example.

When it is determined in Step S102 that the ammonia adsorption amount in the second cell 72 is equal to or greater than the first threshold, the ECU 8 advances to Step S103, in which the urea addition valve 6 is controlled to stop urea addition or reduce the amount of added urea.

When the NOx reduction catalyst 7 is in a low temperature state, the adsorption amount fixing control is stopped or the amount of added urea is reduced such that the ammonia adsorption amount in the NOx reduction catalyst 7 falls below the aforesaid target adsorption amount.

When the NOx reduction catalyst 7 is in a high temperature state, the equivalent amount addition control is stopped or the amount of added urea is reduced such that the amount of ammonia flowing into the NOx reduction catalyst 7 falls below an amount equivalent to the amount of NOx flowing into the NOx reduction catalyst 7, detected by the NOx sensor 10.

When it is determined in Step S102 that the ammonia adsorption amount in the second cell 72 is smaller than the first threshold, on the other hand, the ECU 8 advances to Step S104, in which normal urea addition is performed by the urea addition valve 6.

When the NOx reduction catalyst 7 is in a low temperature state, the adsorption amount fixing control is performed to align the ammonia adsorption amount in the NOx reduction catalyst 7 with the target adsorption amount. When the NOx reduction catalyst 7 is in a high temperature state, the equivalent amount addition control is performed to align the amount of ammonia flowing into the NOx reduction catalyst 7 with an amount equivalent to the amount of NOx flowing into the NOx reduction catalyst 7, detected by the NOx sensor 10.

The ECU 8 that executes the processing from Step S101 to Step S104 is an example of a "control device".

Next, an example of urea addition control according to a second embodiment of the invention, in which a likelihood of ammonia slip is determined from the ammonia adsorption amount distribution through the NOx reduction catalyst 7 and the urea addition control is performed on the basis thereof, will be described.

Figure 7A:
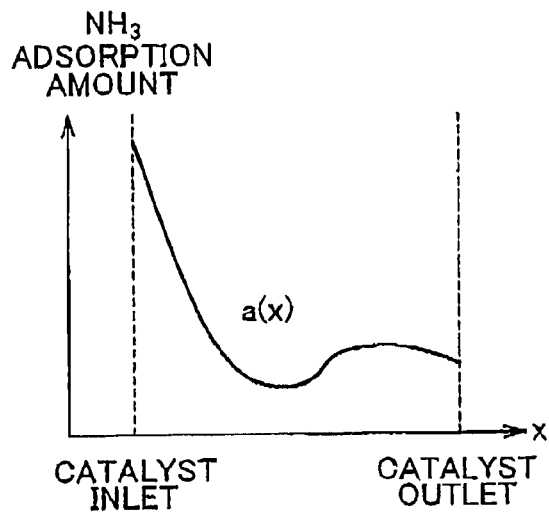
Figure 7B:
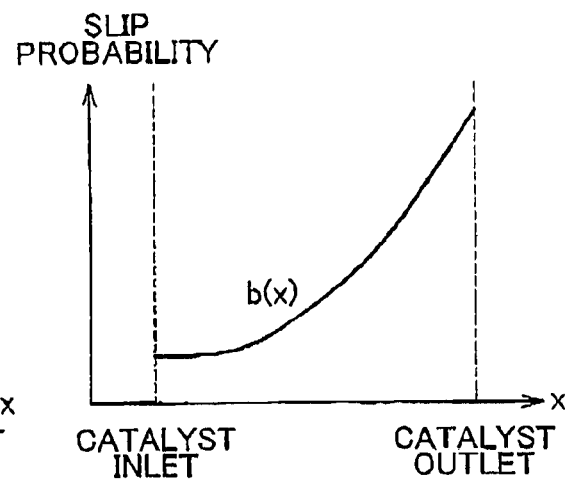

FIGS. 7A and 7B are views illustrating a method of determining the likelihood of ammonia slip. FIG. 7A is a view showing the ammonia adsorption amount distribution through the NOx reduction catalyst 7. The abscissa in FIG. 7A shows an exhaust gas flow direction position (coordinate) within the NOx reduction catalyst 7, and the ordinate shows the ammonia adsorption amount. In FIG. 7A, a curve a (x) represents the ammonia adsorption amount distribution through the NOx reduction catalyst 7.

The adsorption amount distribution a (x) shown in FIG. 7A is an example of a distribution in which the ammonia adsorption amount in the vicinity of an inlet into the NOx reduction catalyst 7 is large, the ammonia adsorption amount in a central portion is small, and the ammonia adsorption amount in the vicinity of an outlet is slightly large. The ammonia adsorption amount distribution appearing in the NOx reduction catalyst 7 is not limited to the distribution shown in FIG. 7A.

The adsorption amount distribution a (x) shown in FIG. 7A is depicted as a continuous function of position. However, FIG. 7A is a schematic diagram, and the invention is not limited to a case in which the ECU 8 obtains the ammonia adsorption amount distribution in the form of a continuous function of position. For example, the adsorption amount distribution may be constituted by adsorption amount data corresponding to the number of divided cells, and when only the ammonia adsorption amount in a part of the NOx reduction catalyst 7 is used in the urea addition control, the adsorption amount distribution may be constituted by ammonia adsorption amount data in this partial region.

When the ammonia adsorbed to the NOx reduction catalyst 7 desorbs from the NOx reduction catalyst 7, the likelihood that the desorbed ammonia will flow out of the NOx reduction catalyst 7 differs depending on the position to which the desorbed ammonia was adsorbed.

As described above, desorbed purifying agent that was adsorbed to the downstream side part of the NOx reduction catalyst is more likely to be a factor in the occurrence of ammonia slip than desorbed purifying agent that was adsorbed to the upstream side part. In other words, when identical amounts of ammonia are adsorbed to different positions within the NOx reduction catalyst, the contribution of the adsorbed ammonia to the likelihood of ammonia slip (the magnitude of a likelihood increasing effect) differs depending on the position.

Hence, in the second embodiment, the urea addition control is performed taking into consideration not only the ammonia adsorption amount distribution through the NOx reduction catalyst, but also differences in the contribution to the likelihood of ammonia slip depending on the position within the NOx reduction catalyst.

FIG. 7B is a view illustrating a slip probability, which is an index of the likelihood that when ammonia adsorbed to the NOx reduction catalyst 7 desorbs from the NOx reduction catalyst 7, the desorbed ammonia will flow out of the NOx reduction catalyst 7 into the downstream side exhaust passage 3. The abscissa in FIG. 7B shows an exhaust gas flow direction position in the NOx reduction catalyst 7, and the ordinate shows a magnitude of the slip probability.

When ammonia is adsorbed to a region in the vicinity of the outlet from the NOx reduction catalyst 7 and the adsorbed ammonia desorbs, ammonia slip is more likely to occur than when ammonia is adsorbed to a region in the vicinity of the inlet into the NOx reduction catalyst 7.

Therefore, as shown by a curve b (x) in FIG. 7B, the slip probability takes a steadily larger value in locations near the outlet from the NOx reduction catalyst 7 and a steadily smaller value in locations near the inlet into the NOx reduction catalyst 7.

The slip probability b (x) of the NOx reduction catalyst 7 is checked in advance through experiment or the like and stored in the ECU 8. A shape of the slip probability b (x) may be fixed. Alternatively, the slip probability b (x) may be made variable by performing corrections and the like thereon in accordance with operating conditions of the internal combustion engine that may affect the likelihood of ammonia slip caused by ammonia that desorbs from the NOx reduction catalyst 7, such as the exhaust gas flow rate and the exhaust gas temperature.

Figure 7C:
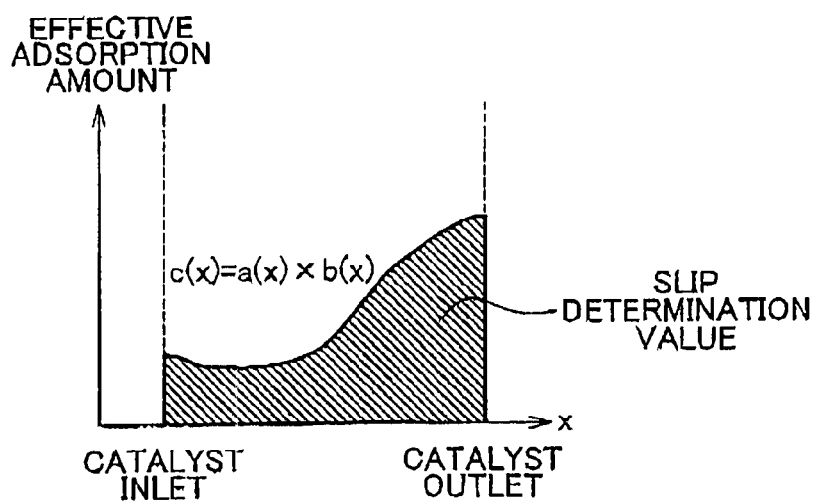

FIG. 7C is a view illustrating an effective adsorption amount distribution. The effective adsorption amount is calculated as a product of the adsorption amount distribution a (x) and the slip probability b (x). The abscissa in FIG. 7C shows the exhaust gas flow direction position in the NOx reduction catalyst 7, and the ordinate shows the effective adsorption amount.

In the example shown in FIGS. 7A, 7B, and 7C, the value of the actual adsorption amount distribution a (x) in the vicinity of the outlet from the NOx reduction catalyst 7 is small, as shown in FIG. 7A. As shown by a curve c (x) in FIG. 7C, however, the value of the effective adsorption amount distribution c (x) in the vicinity of the outlet from the NOx reduction catalyst 7 is large.

In other words, a property according to which the ammonia adsorbed to the vicinity of the outlet from the NOx reduction catalyst 7 has a greater effect on the occurrence of ammonia slip is reflected in the value of the effective adsorption amount. The effective adsorption amount distribution c (x) may be considered as a distribution obtained by converting the adsorption amount distribution a (x) into a truer quantity in terms of the effect on the likelihood of ammonia slip.

The effective adsorption amount distribution c (x) shown in FIG. 7C is depicted as a continuous function of position. However, similarly to the adsorption amount distribution a (x) described above, FIG. 7C is a schematic diagram, and the effective ammonia adsorption amount distribution c (x) obtained by the ECU 8 is not limited to the form of a continuous function.

In the second embodiment, a slip determination value 1 integrating the effective adsorption amount distribution c (x) from the inlet to the outlet of the NOx reduction catalyst 7 and a slip determination value 2 integrating the effective adsorption amount distribution c (x) from a pre set position within the catalyst to the outlet are determined. The slip determination value 1 and the slip determination value 2 are then compared respectively with a first slip determination threshold and a second slip determination threshold, which serve as preset references for performing a slip determination, and when the slip determination value 1 equals or exceeds the first slip determination threshold or the slip determination value 2 equals or exceeds the second slip determination threshold, control performed to stop urea water addition by the urea addition valve 6 or reduce the amount of urea water added by the urea addition valve 6. In the second embodiment, the first slip determination threshold and the second slip determination threshold may be set as an example of a "second threshold".

The slip determination values 1 and 2 may be considered as an effective ammonia adsorption amount throughout the entire NOx reduction catalyst 7. In other words, the slip determination values 1 and 2 are values obtained by converting the overall ammonia adsorption amount in the NOx reduction catalyst 7 into a truer amount in terms of the effect on ammonia slip, taking into account differences in the contribution to the likelihood of ammonia slip depending on the position within the NOx reduction catalyst to which the ammonia is adsorbed. When the effective adsorption amount is large, the likelihood of ammonia slip may be determined to be high.

According to the second embodiment, the likelihood of ammonia slip is determined on the basis of the slip determination values 1 and 2, and therefore the likelihood of ammonia slip can be determined more accurately than in a case where the likelihood of ammonia slip is determined simply on the basis of the overall ammonia adsorption amount in the NOx reduction catalyst 7.

Furthermore, the urea addition control is performed on the basis of this determination, and therefore ammonia slip can be suppressed more reliably while suppressing unnecessary stoppages and reductions in urea addition. As a result, the ammonia adsorption amount can be increased to a maximum while suppressing ammonia slip, enabling a further improvement in the NOx purification rate.

Figure 8:
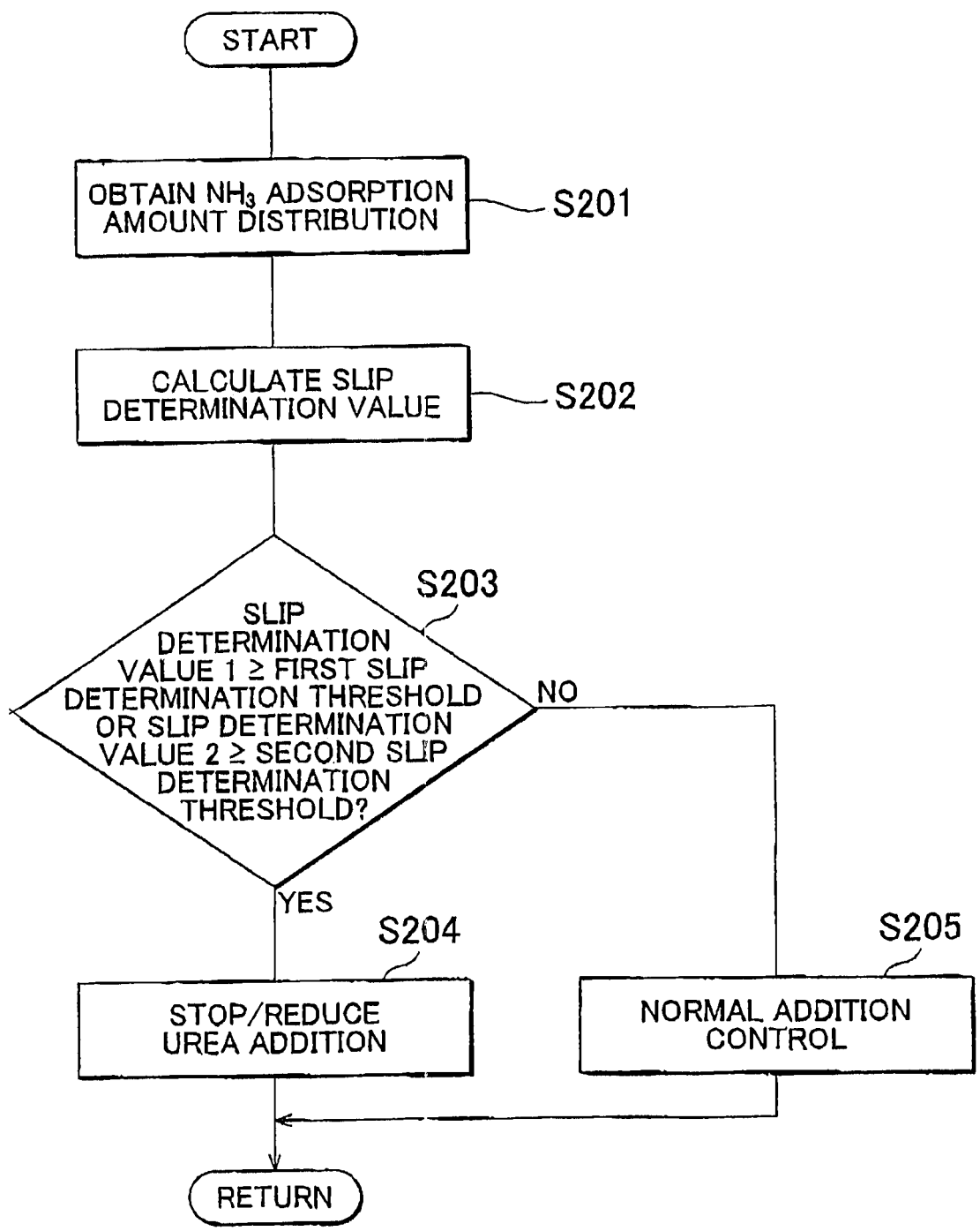
FIG. 8 is a flowchart illustrating the urea addition control according to the second embodiment.

FIG. 8 is a flowchart illustrating the urea addition control according to the second embodiment. The processing illustrated in the flowchart is executed periodically by the ECU 8.

First, in Step S201, the ECU 8 obtains the ammonia adsorption amount distribution through the NOx reduction catalyst. A method of obtaining the ammonia adsorption amount distribution will be described below.

In Step S202, the ECU 8 calculates the slip determination values 1, 2. As described above, the slip determination values 1, 2 are calculated by integrating the effective adsorption amount distribution c (x), which is calculated as the product of the ammonia adsorption amount distribution a (x) obtained in Step S201 and the slip probability b (x), from the inlet to the outlet of the NOx reduction catalyst 7 or from a preset position within the catalyst to the outlet.

In Step S203, the ECU 8 determines whether or not the slip determination value 1 obtained in Step S202 equals or exceeds the first slip determination threshold or whether or not the slip determination value 2 equals or exceeds the second slip determination threshold. The first and second slip determination thresholds are reference values of the slip determination values 1, 2, and may be determined on the basis of an upper limit value of the slip determination value in an adsorption state where the amount of ammonia flowing out of the NOx reduction catalyst 7 to the downstream side due to ammonia slip does not exceed the predetermined allowable level, for example.

When it is determined in Step S203 that the slip determination value 1 equals or exceeds the first slip determination threshold or the slip determination value 2 equals or exceeds the second slip determination threshold, the ECU 8 advances to Step S204, in which urea addition by the urea addition valve 6 is stopped or the amount of added urea is reduced. This processing is similar to Step S103 in FIG. 6.

When it is determined in Step S203 that the slip determination value 1 is smaller than the first slip determination threshold and the slip determination value 2 is smaller than the second slip determination threshold, on the other hand, the ECU 8 advances to Step S205, in which urea addition is performed normally by the urea addition valve 6. This processing is similar to Step S104 in FIG. 6.

The ECU 8 that executes the processing from Step S201 to Step S205 is an example of the "control device".

Next, an example of urea addition control according to a third embodiment of the invention will be described. In the third embodiment, when variation in the amount of ammonia that can be adsorbed by the NOx reduction catalyst 7 is predicted in accordance with variation in the temperature of the NOx reduction catalyst 7 due to variation in the operating conditions of the internal combustion engine 1 and so on, the urea addition control is performed in accordance with the prediction.

The amount of ammonia that can be adsorbed by the NOx reduction catalyst 7 is dependent on the temperature of the NOx reduction catalyst 7. The amount of ammonia that can be adsorbed by the NOx reduction catalyst 7 decreases steadily as the temperature of the NOx reduction catalyst 7 rises.

In a situation where the temperature of the exhaust gas flowing into the NOx reduction catalyst 7 rises, for example when the operating conditions of the internal combustion engine 1 shift greatly to a high load side due to rapid acceleration or processing is performed to oxidize and remove the particulate matter trapped in the filter 5 disposed on the upstream side of the NOx reduction catalyst 7, the temperature of the NOx reduction catalyst 7 rises, and as a result, an upper limit amount of ammonia that can be adsorbed to the NOx reduction catalyst 7 decreases.

When a rapid temperature increase occurs, there may not be enough time to perform control for stopping or reducing urea addition, and as a result, an excessive amount of ammonia may be supplied, causing ammonia slip.

A time delay occurs between an increase in the temperature of the exhaust gas flowing into the NOx reduction catalyst 7 or variation in the operating conditions of the internal combustion engine 1 and a point at which the effect thereof actually becomes apparent as an increase in the temperature of the NOx reduction catalyst 7. Therefore, by detecting variation in the temperature of the exhaust gas flowing into the NOx reduction catalyst 7 or variation in the operating conditions of the internal combustion engine 1, it is possible to predict a rapid increase in the temperature of the NOx reduction catalyst 7 in the near future.

By executing control to stop or reduce urea addition after predicting an increase in the temperature of the NOx reduction catalyst, a situation in which an excessive amount of ammonia is supplied to the NOx reduction catalyst 7 when the temperature of the NOx reduction catalyst 7 actually increases such that the amount of adsorbable ammonia decreases can be avoided.

Hence, in the third embodiment, when a rapid increase in the temperature of the NOx reduction catalyst 7 is predicted on the basis of variation in the temperature of the exhaust gas flowing into the NOx reduction catalyst 7 or variation in the operating conditions of the internal combustion engine 1, urea addition is stopped or reduced in advance, even though an actual temperature increase has not yet occurred in the NOx reduction catalyst 7.

In the third embodiment, when a transitory state during which the operating conditions of the internal combustion engine 1 vary from a low load to a high load is detected, and when an increase in the temperature of the exhaust gas flowing into the NOx reduction catalyst 7 is detected by the exhaust gas temperature sensor 9, the slip determination values 1, 2 are corrected in accordance with the amount of variation in the load and the increase in the temperature of the exhaust gas. The slip determination values 1, 2 are corrected to steadily higher values as the amount of variation in the load and the increase in the temperature of the exhaust gas increase.

Hence, when a rapid, increase in the load of the internal combustion engine or a rapid increase in the temperature of the exhaust gas is detected, the slip determination values 1, 2 are calculated to higher values than when such variation is not detected, even if the ammonia adsorption amount distribution a (x) in the NOx reduction catalyst and the slip probability b (x) remain constant.

Therefore, when a rapid increase in the load of the internal combustion engine or a rapid increase in the temperature of the exhaust gas is detected, a determination result "slip determination value 1≥first slip determination threshold" or "slip determination value 2≥second slip determination threshold" is more likely to occur during the comparison between the slip determination values 1, 2 and the first and second slip determination thresholds in Step S203 of FIG. 8.

In other words, when a rapid increase in the load of the internal combustion engine or a rapid increase in the temperature of the exhaust gas is detected, urea addition is more likely to be stopped or reduced, even though an actual temperature increase has not yet occurred in the NOx reduction catalyst 7. Therefore, when an increase in the likelihood of ammonia slip due to an increase in the temperature of the NOx reduction catalyst 7 in the near future is predicted, control can be executed to stop or reduce urea addition in advance.

Hence, when the temperature of the NOx reduction catalyst 7 actually increases such that the upper limit amount of adsorbable ammonia decreases, ammonia supply has already been stopped or reduced, and therefore an excessive ammonia supply can be avoided. As a result, ammonia slip can be suppressed when the operating conditions vary such that the temperature of the NOx reduction catalyst 7 increases.

Figure 9A:
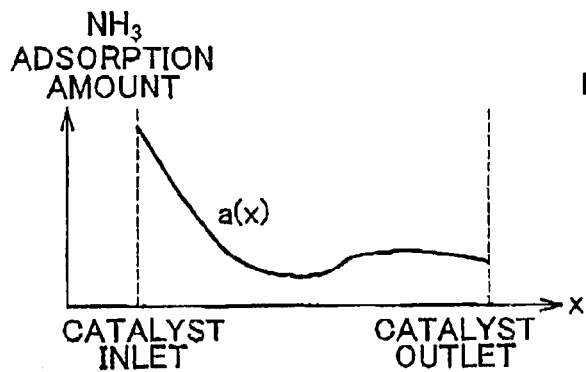
Figure 9B:
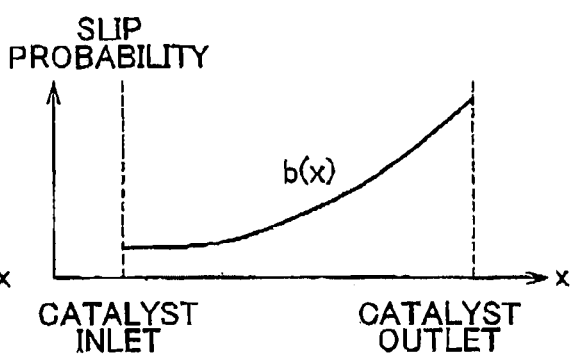
Figure 9C:
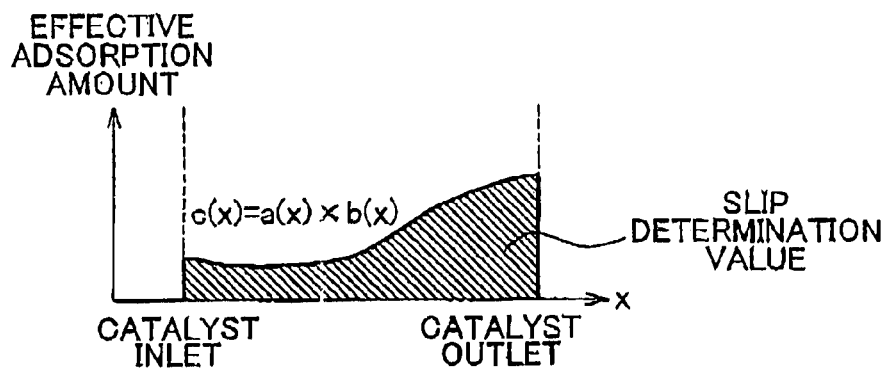

FIGS. 9A to 9C are views showing a method of correcting the likelihood of ammonia slip in accordance with a prediction of an increase in the temperature of the NOx reduction catalyst 7.

Figure 9D:
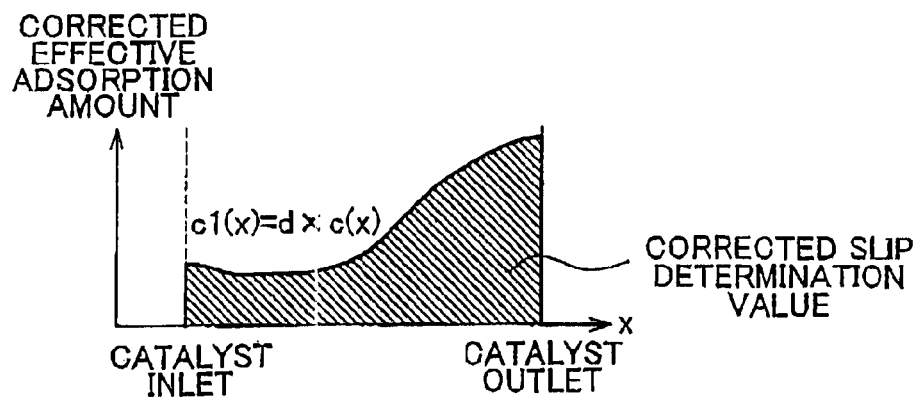

FIGS. 9A to 9C are similar to FIGS. 7A to 7C described in the second embodiment, and therefore description thereof has been omitted. FIG. 9D is a view showing a corrected effective adsorption amount distribution c1 (x) obtained by correcting the effective adsorption amount distribution c (x), which is calculated as the product of the ammonia adsorption amount distribution a (x) in the NOx reduction catalyst 7, shown in FIG. 9A, and the slip probability b (x) of the NOx reduction catalyst 7, shown in FIG. 9B, in an increasing direction using a correction coefficient d.

The slip determination value 1 and the slip determination value 2 are determined by integrating the corrected effective adsorption amount distribution c1 (x) from the inlet to the outlet of the NOx reduction catalyst 7 and from a preset position within the catalyst to the outlet, respectively. Note that a corrected slip determination value 1 and a corrected slip determination value 2 may be calculated by correcting the slip determination value 1 and the slip determination value 2 calculated from the pre-correction effective adsorption amount distribution c (x) in an increasing direction using the correction coefficient d.

In the third embodiment, the corrected slip determination value 1 and the corrected slip determination value 2 are compared respectively with the first slip determination threshold and the second slip determination threshold described in the second embodiment, and when the slip determination value 1 equals or exceeds the first slip determination threshold or the slip determination value 2 equals or exceeds the second slip determination threshold, control is performed to stop urea water addition by the urea addition valve 6 or reduce the amount of urea water added by the urea addition valve 6. The corrected slip determination value 1 and slip determination value 2 may be considered as the effective ammonia adsorption amount of the entire NOx reduction catalyst 7, corrected taking into account variation in the likelihood of ammonia slip due to an increase in the temperature of the NOx reduction catalyst 7 in the near future.

According to the third embodiment, ammonia slip can be suppressed favorably when the operating conditions vary such that the temperature of the NOx reduction catalyst 7 increases.

Figure 10:
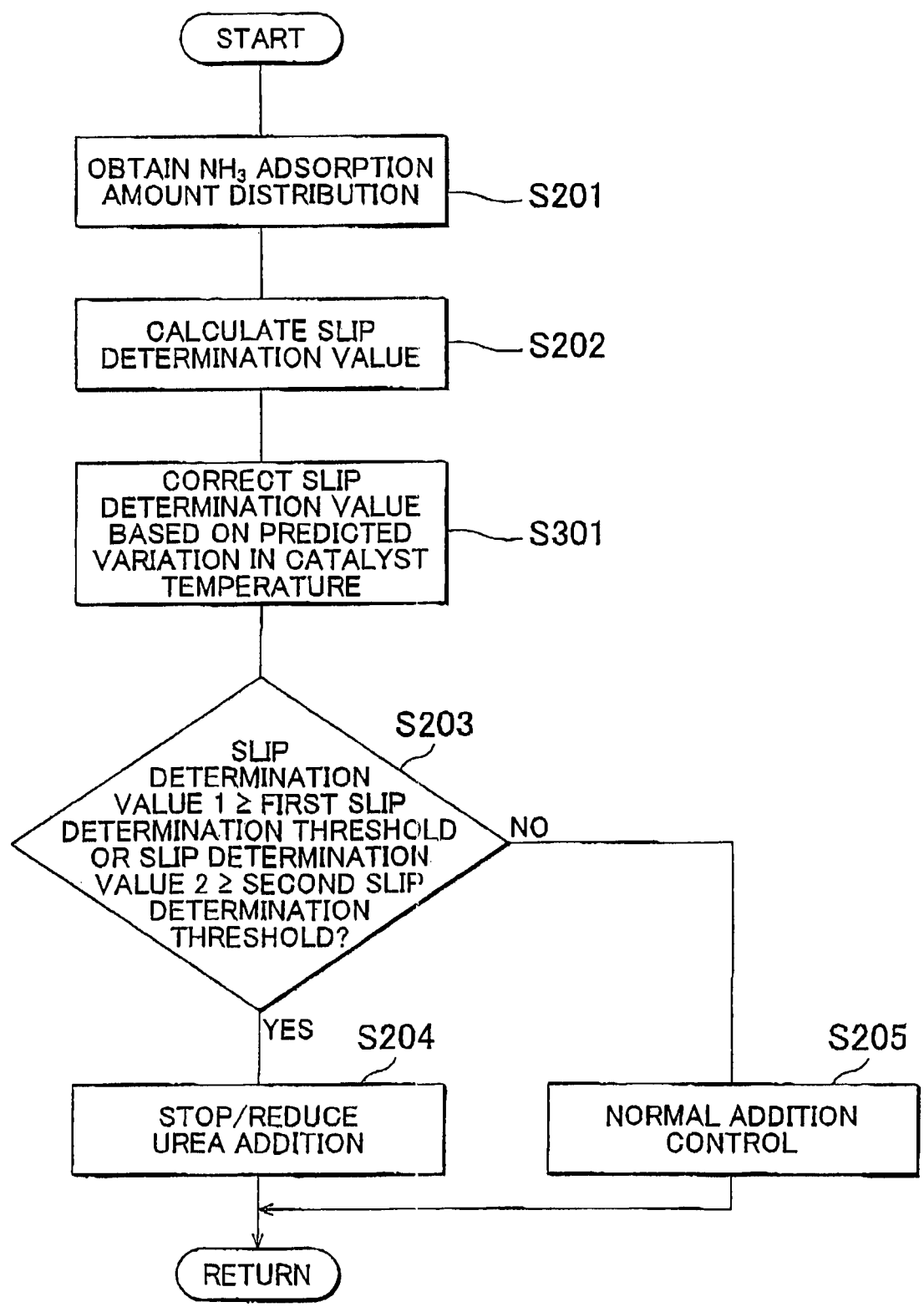
FIG. 10 is a flowchart illustrating the urea addition control according to the third embodiment.

FIG. 10 is a flowchart illustrating the urea addition control according to the third embodiment. The processing illustrated in the flowchart is executed periodically by the ECU 8.

In FIG. 10, steps in which the processing content is identical to FIG. 8 have been allocated identical numbers to those used in FIG. 8, and description thereof has been omitted. In the flowchart of FIG. 10, the slip determination values 1, 2 are calculated in Step S202, whereupon the slip determination values 1, 2 calculated in Step S202 are corrected in Step S301.

Here, when variation in the load of the internal combustion engine 1 by at least a predetermined amount toward the high load side is detected or when an increase in the exhaust gas temperature detected by the exhaust gas temperature sensor 9 by at least a predetermined amount is detected, the slip determination values 1, 2 are corrected by multiplying the correction coefficient d corresponding to the load variation amount or the temperature increase by the slip determination values 1, 2 calculated in Step S202. Note that the slip determination values 1, 2 are corrected only when the load variation amount or the temperature increase exceeds a certain threshold. Further, the correction coefficient d may be set at a fixed value.

By making the correction coefficient d variable such that the value thereof increases as the increase in the load of the internal combustion engine or the increase in the exhaust gas temperature becomes greater, the slip determination value 1 is more likely to equal or exceed the first slip determination threshold and the slip determination value 2 is more likely to equal or exceed the second slip determination threshold in the determination of Step S203 when the predicted increase in the temperature of the NOx reduction catalyst 7 in the near future is large, and therefore ammonia slip can be suppressed more reliably.

In Step S203, a determination is made as to whether or not the corrected slip determination value 1 calculated in Step S301 equals or exceeds the first slip determination threshold or whether or not the corrected slip determination value 2 equals or exceeds the second slip determination threshold. When the corrected slip determination value 1 equals or exceeds the first slip determination threshold or the corrected slip determination value 2 equals or exceeds the second slip determination threshold, the routine advances to Step S204, where urea addition is stopped or reduced. When the corrected slip determination value 1 is smaller than the first slip determination threshold and the corrected slip determination value 2 is smaller than the second slip determination threshold, on the other hand, the routine advances to Step S205, in which the urea addition control is performed normally.

The method of obtaining the ammonia adsorption amount distribution through the NOx reduction catalyst in the second embodiment and the third embodiment will now be described. An exhaust gas control system for an internal combustion engine constituted as shown in FIG. 11 will be used as an example in the following description.

Figure 11:
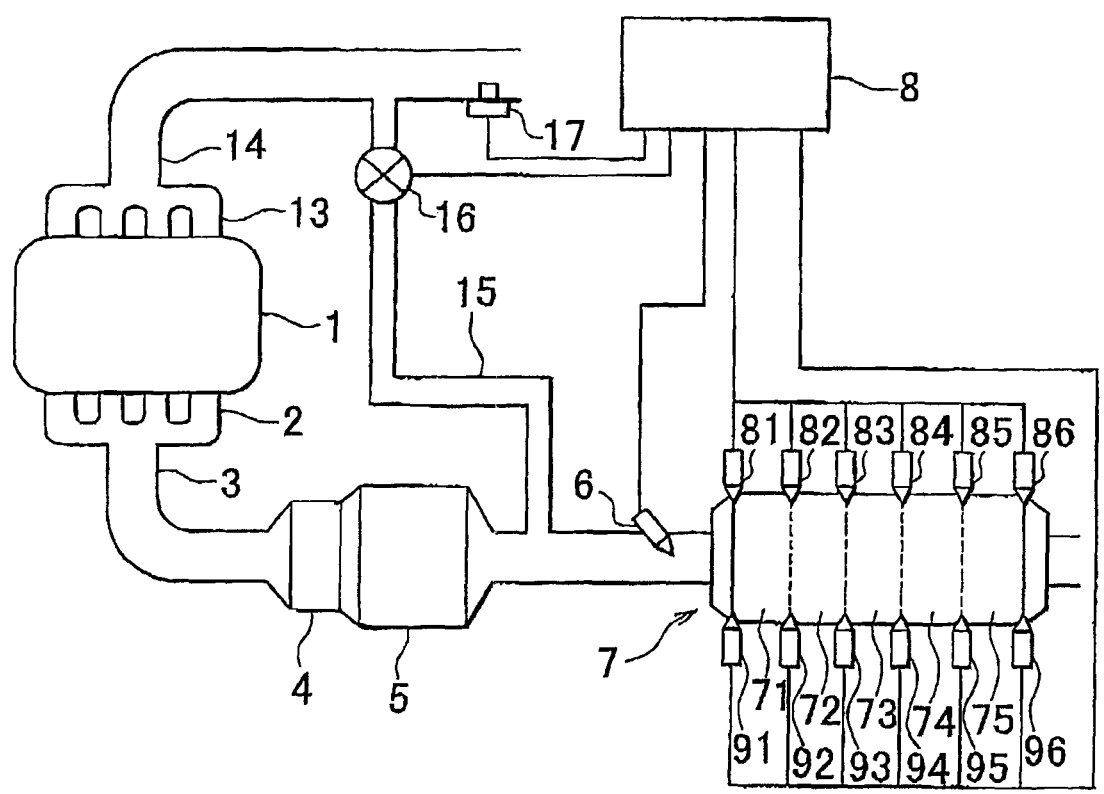
FIG. 11 is a view showing a constitutional example of a system for estimating the ammonia adsorption amount distribution through the NOx reduction catalyst according to the third embodiment.

In FIG. 11, an intake passage 14 communicates with the internal combustion engine 1 via an intake manifold 13 and the exhaust passage 3 communicates with the internal combustion engine 1 via the exhaust manifold 2. An air sensor 17 that detects the intake air amount is provided in the intake passage 14. The oxidation catalyst 4, filter 5, and NOx reduction catalyst 7 are provided in the exhaust passage 3 as an exhaust gas control apparatus in order from the upstream side of the exhaust gas flow direction. The urea addition valve 6 for adding urea water is provided in the exhaust passage 3 on the upstream side of the NOx reduction catalyst 7.

An EGR passage 15 is provided to connect the exhaust passage 3 to the intake passage 14 downstream of the filter 5, and a part of the exhaust gas is recirculated to the intake passage 14 through the EGR passage 15 as EGR gas. An EGR valve 16 that regulates a flow rate of the EGR gas is provided in the EGR passage 15.

In the NOx reduction catalyst 7, the ammonia adsorption amount distribution through the NOx reduction catalyst 7 is estimated using a model divided into a plurality of cells in the exhaust gas flow direction. Here, an example in which the NOx reduction catalyst 7 is divided into five cells, as shown in FIG. 11, will be described. A cell 71 positioned furthest upstream is set as a first cell, and subsequent cells heading toward the downstream side are set respectively as a second cell 72, a third cell 73, a fourth cell 74, and a fifth cell 75.

In the NOx reduction catalyst 7, NOx sensors 81, 82, 83, 84, 85, 86 (component amount sensors) are provided to detect the NOx concentration on either side of each cell. The NOx sensor 81 may be considered as a sensor that detects the NOx concentration of the exhaust gas that flows into the NOx reduction catalyst 7, and the NOx sensor 86 may be considered as a sensor that detects the NOx concentration of the exhaust gas that flows out of the NOx reduction catalyst 7.

Ammonia sensors 91, 92, 93, 94, 95, 96 (purifying agent amount sensors) are provided to detect the ammonia concentration on either side of each cell. The ammonia sensor 91 may be considered as a sensor that detects the ammonia concentration of the exhaust gas that flows into the NOx reduction catalyst 7, and the ammonia sensor 96 may be considered as a sensor that detects the ammonia concentration of the exhaust gas that flows out of the NOx reduction catalyst 7.

Detection values from the respective sensors described above are input into the ECU 8. On the basis of the detection values input from the respective sensors, the ECU 8 controls an opening of the EGR valve 16, executes urea addition control on the urea addition valve 6, and executes various types of operation control, such as fuel injection control, on the internal combustion engine 1.

The ECU 8 estimates the ammonia adsorption amount in the second cell 72, for example, as follows.

(1) First, the intake air amount detected by the air sensor 17 is converted from a mass flow rate into a molar flow rate. Next, molar amounts of $H_2O$ and $CO_2$ and molar amounts of residual air and residual fuel when a fuel injection amount obtained from a fuel injection control routine is burned are calculated. The internal combustion engine 1 is a diesel engine, and therefore air normally remains. From these calculations, a total molar flow rate of the $H_2O$, $CO_2$, and residual air or fuel in the exhaust gas discharged from the internal combustion engine 1 into the exhaust passage 3 is obtained, and on the basis thereof, a molar flow rate of the gas passing through the NOx reduction catalyst 7 is calculated.

(2) A molar flow rate of the ammonia flowing into the second cell 72 is calculated by multiplying the ammonia concentration detected by the ammonia sensor 92 by the molar flow rate of the gas passing through the NOx reduction catalyst 7, obtained in (1). Further, a molar flow rate of the ammonia passing through the second cell 72 is calculated by multiplying the ammonia concentration detected by the ammonia sensor 93 by the molar flow rate of the gas passing through the NOx reduction catalyst 7, obtained in (1).

(3) A difference between a value obtained by multiplying a NOx concentration detected by the NOx sensor 82 by the molar flow rate of the gas passing through the NOx reduction catalyst 7 obtained in (1) and a value obtained by multiplying the NOx concentration detected by the NOx sensor 83 by the molar flow rate of the gas passing through the NOx reduction catalyst 7 obtained in (1) is calculated, whereby a reduction in the amount of NOx in the second cell 72 is calculated.

(4) An amount of ammonia consumed in the second cell 72 and a molar amount of ammonia adsorbed to the second cell 72 are calculated from the difference between the molar flow rate of the ammonia flowing into the second cell 72 and the molar flow rate of the ammonia flowing out of the second cell 72, obtained in (2), and the reduction in the amount of NOx, obtained in (3). The current ammonia adsorption amount in the second cell 72 is then calculated on the basis of these amounts and a molar amount of ammonia already adsorbed to the second cell 72 (a previously estimated value).

The ammonia adsorption amounts of the other cells can be estimated using a similar calculation method on the basis of the detection values obtained by the ammonia sensors and NOx sensors provided on either side of each cell. The number of divided cells is not limited to five, and the cells may be divided evenly or unevenly.

Further, in the example shown in FIG. 11, the ammonia sensors and NOx sensors are provided on either side of all cells, but the sensors may be provided on either side of a part of the cells, and the ammonia concentration and NOx concentration on either side of the other cells may be obtained by estimations based on the detection values of the sensors and so on.

Furthermore, when the ammonia adsorption amount in a part of the cells is the only information required for the urea addition control, sensors may be provided only on either side of the corresponding cells.

A fourth embodiment of this invention will now be described.

Figure 12:
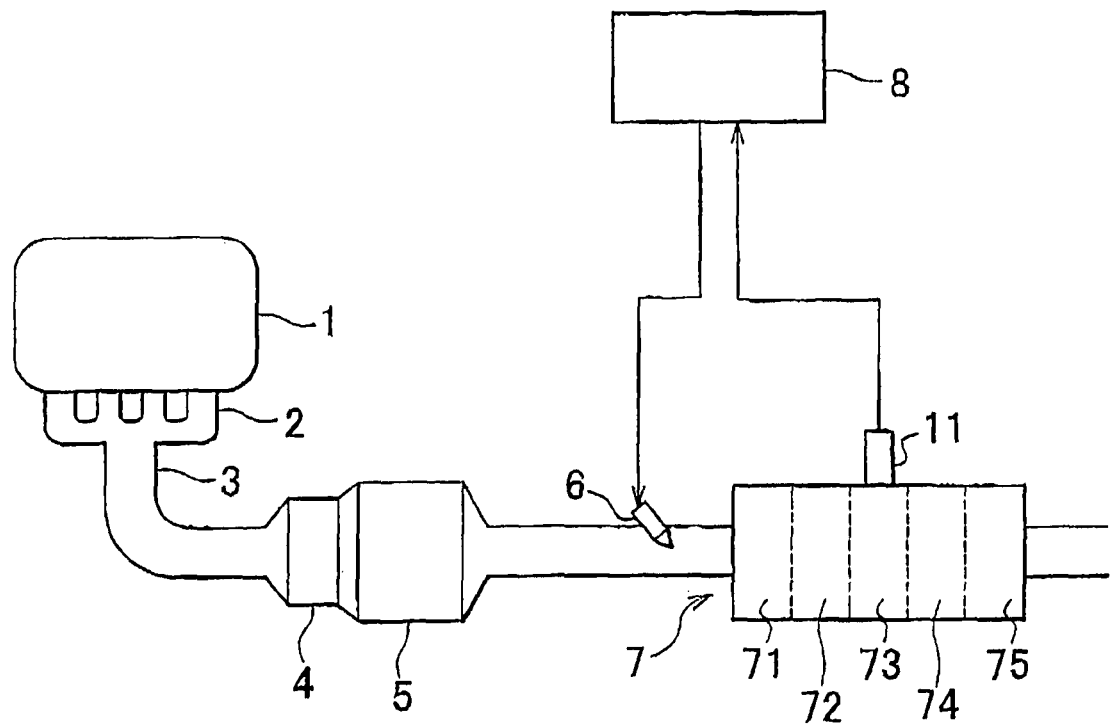
FIG. 12 is a view showing a schematic constitution of an exhaust gas control apparatus for an internal combustion engine according to a fourth embodiment.

FIG. 12 is a view showing a schematic constitution of an exhaust gas control apparatus for an internal combustion engine according to the fourth embodiment. In FIG. 12, the exhaust passage 3 is connected to the internal combustion engine 1 via the exhaust manifold 2 such that exhaust gas from the internal combustion engine 1 is discharged into the exhaust passage 3.

The oxidation catalyst 4, the filter 5 that traps particulate matter contained in the exhaust gas, and the NOx reduction catalyst 7 that selectively reduces and removes NOx contained in the exhaust gas from the exhaust gas using ammonia as a reducing agent are provided in the exhaust gas passage 3 in order from the upstream side of the exhaust gas flow direction.

The urea addition valve 6 that adds urea water to the exhaust gas is provided in the exhaust passage 3 on the upstream side of the NOx reduction catalyst 7. The urea added to the exhaust gas by the urea addition valve 6 decomposes in the exhaust gas so as to generate ammonia. This ammonia is adsorbed to the NOx reduction catalyst 7 and performs a redox reaction with the NOx in the NOx reduction catalyst 7.

The catalyst temperature sensor 11 that detects the temperature of the NOx reduction catalyst 7 is provided in the NOx reduction catalyst 7. A detection value generated by the catalyst temperature sensor 11 is input into the ECU 8.

Detection values from the catalyst temperature sensor 11 and various other sensors are input into the ECU 8, and on the basis of the detection values input from the various sensors, the ECU 8 executes urea addition control on the urea addition valve 6 and various types of operation control, such as fuel injection control, on the internal combustion engine 1.

Even when the amount of ammonia adsorbed to the entire NOx reduction catalyst remains constant, the NOx purification rate differs according to the distribution of the ammonia adsorption amount within the NOx reduction catalyst.

Figure 13A:
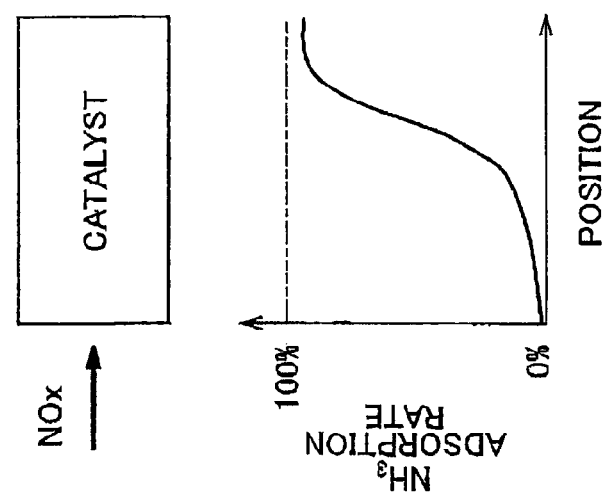
Figure 13B:
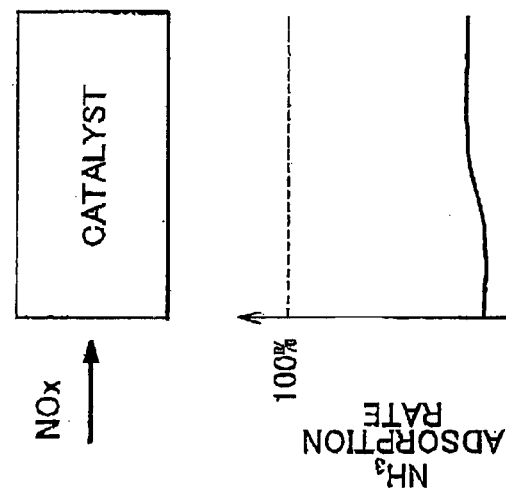
Figure 13C:
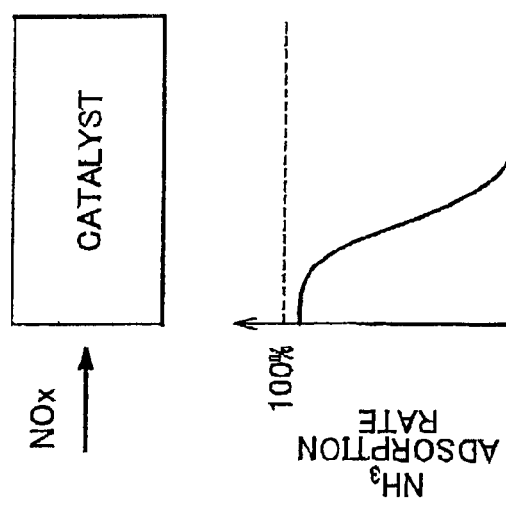

FIGS. 13A to 13C are views showing examples of ammonia adsorption amount distributions within the NOx reduction catalyst. In each of FIGS. 13A to 13C, the abscissa shows the exhaust gas flow direction position in the NOx reduction catalyst and the ordinate shows an ammonia adsorption rate. The adsorption rate is a ratio of the adsorption amount to a saturation adsorption amount.

FIG. 13A shows an adsorption amount distribution in which the ammonia adsorption rate is higher in the upstream side part of the NOx reduction catalyst in the exhaust gas flow direction. FIG. 13B shows an adsorption amount distribution in which the ammonia is adsorbed substantially evenly (uniformly) throughout the NOx reduction catalyst in the exhaust gas flow direction. FIG. 13C shows an adsorption amount distribution in which the ammonia adsorption rate is higher in the downstream side part of the NOx reduction catalyst in the exhaust gas flow direction.

When the overall ammonia adsorption amount of the NOx reduction catalyst remains constant, the NOx purification rate tends to be higher with the adsorption amount distribution shown in FIG. 13A, in which the ammonia adsorption amount is greater on the upstream side, than with the adsorption amount distribution shown in FIG. 13B, in which the ammonia is adsorbed substantially evenly throughout the entire NOx reduction catalyst.

As regards the likelihood of ammonia slip, meanwhile, ammonia slip is more likely to occur with the adsorption amount distribution shown in FIG. 13C, in which the ammonia adsorption amount is greater on the downstream side, than with the adsorption amount distribution shown in FIG. 13B, in which the ammonia is adsorbed substantially evenly throughout the entire NOx reduction catalyst.

In the fourth embodiment, the urea addition amount is controlled to achieve a high NOx purification rate while suppressing ammonia slip by taking into account differences in the NOx purification rate and the likelihood of ammonia slip corresponding to the ammonia adsorption amount distribution through the NOx reduction catalyst.

More specifically, as shown in FIG. 12, the ECU 8 estimates the ammonia adsorption amount in the first cell 71 positioned furthest upstream and the ammonia adsorption amount in the second cell 72 positioned adjacent to the first cell 71 on the downstream side on a model obtained by dividing the NOx reduction catalyst 7 into five cells in the exhaust gas flow direction.

Next, first control for feedback-controlling the amount of urea added by the urea addition valve 6 so that the ammonia adsorption amount in the first cell 71 reaches or exceeds a predetermined threshold close to the saturation adsorption amount and second control for feedback-controlling the amount of urea added by the urea addition valve 6 so that the ammonia adsorption amount in the second cell 72 reaches a predetermined target value that is sufficiently smaller than the saturation adsorption amount are executed.

The "predetermined target value" is determined on the basis of an ammonia adsorption amount in the second cell 72 at which the amount of ammonia flowing out of the NOx reduction catalyst 7 into the downstream side exhaust passage 3 due to ammonia slip does not exceed a predetermined allowable level.

Figure 14:
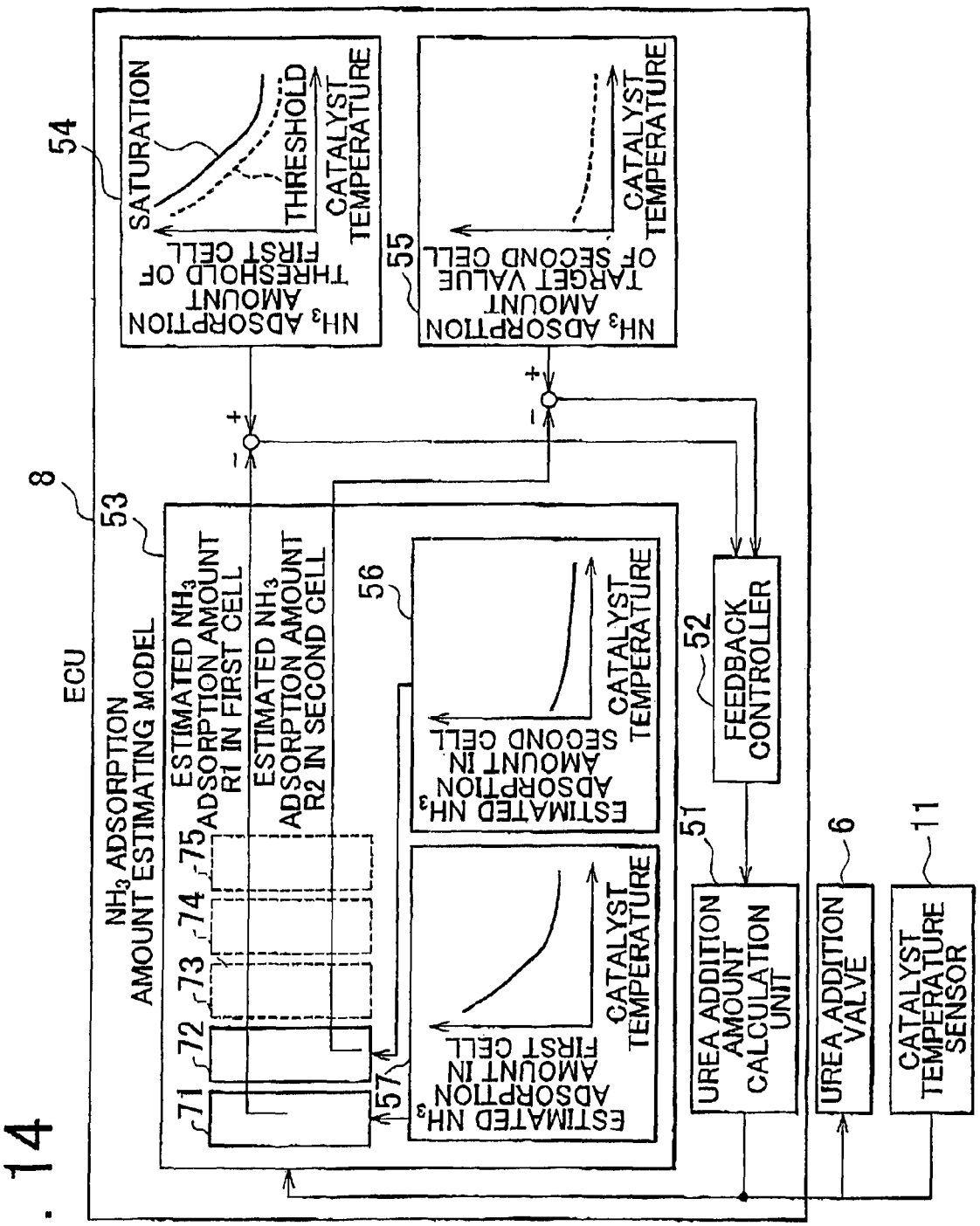
FIG. 14 is a control block diagram illustrating urea addition control according to the fourth embodiment.

FIG. 14 is a control block diagram illustrating the urea addition control described above. As shown in FIG. 14, the ECU 8 calculates an estimated ammonia adsorption amount R1 in the first cell 71 and an estimated ammonia adsorption amount R2 in the second cell 72 using an ammonia adsorption amount estimating model 53 constituted by a model 57 for estimating the ammonia adsorption amount in the first cell 71 on the basis of the urea addition amount and the temperature of the NOx reduction catalyst 7 input from the catalyst temperature sensor 11 and a model 56 for estimating the ammonia adsorption amount in the second cell 72 on the basis of the urea addition amount and the temperature of the NOx reduction catalyst 7 input from the catalyst temperature sensor 11.

Note that the ammonia adsorption amount estimating model 53 may be model for estimating the ammonia adsorption amounts in the first cell 71 and the second cell 72 on the basis of not only the temperature of the NOx reduction catalyst 7 detected by the catalyst temperature sensor 11, but also information such as the intake air amount and fuel injection amount of the internal combustion engine 1, the amounts of NOx flowing into and out of the NOx reduction catalyst 7, and the amount of ammonia flowing out of the NOx reduction catalyst 7, and when an EGR device is provided, information indicating an EGR valve opening.

The ECU 8 holds a map 54 for setting the threshold of the ammonia adsorption amount in the first cell 71 in accordance with the temperature of the NOx reduction catalyst 7 input from the catalyst temperature sensor 11 and a map 55 for setting the target value of the ammonia adsorption amount in the second cell 72 in accordance with the temperature of the NOx reduction catalyst 7 input from the catalyst temperature sensor 11.

When the estimated ammonia adsorption amount R1 in the first cell, estimated using the ammonia adsorption amount estimating model 53, is smaller than the threshold set on the map 54, the ECU 8 calculates a correction amount to be applied to the urea addition amount by a feedback controller 52 in order to eliminate the difference between the estimated ammonia adsorption amount R1 and the threshold.

The correction amount is input into a urea addition amount calculation unit 51, whereupon the amount of urea to be added by the urea addition valve 6 is calculated and a control signal is output to the urea addition valve 6.

The ECU 8 calculates a difference between the estimated ammonia adsorption amount R2 in the second cell, estimated using the ammonia adsorption amount estimating model 53, and the target value set on the map 55, and calculates a correction amount to be applied to the urea addition amount by the feedback controller 52 in order to eliminate this difference.

The correction amount is input into the urea addition amount calculation unit 51, whereupon the amount of urea to be added by the urea addition valve 6 is calculated and a control signal is output to the urea addition valve 6.

Figure 15:
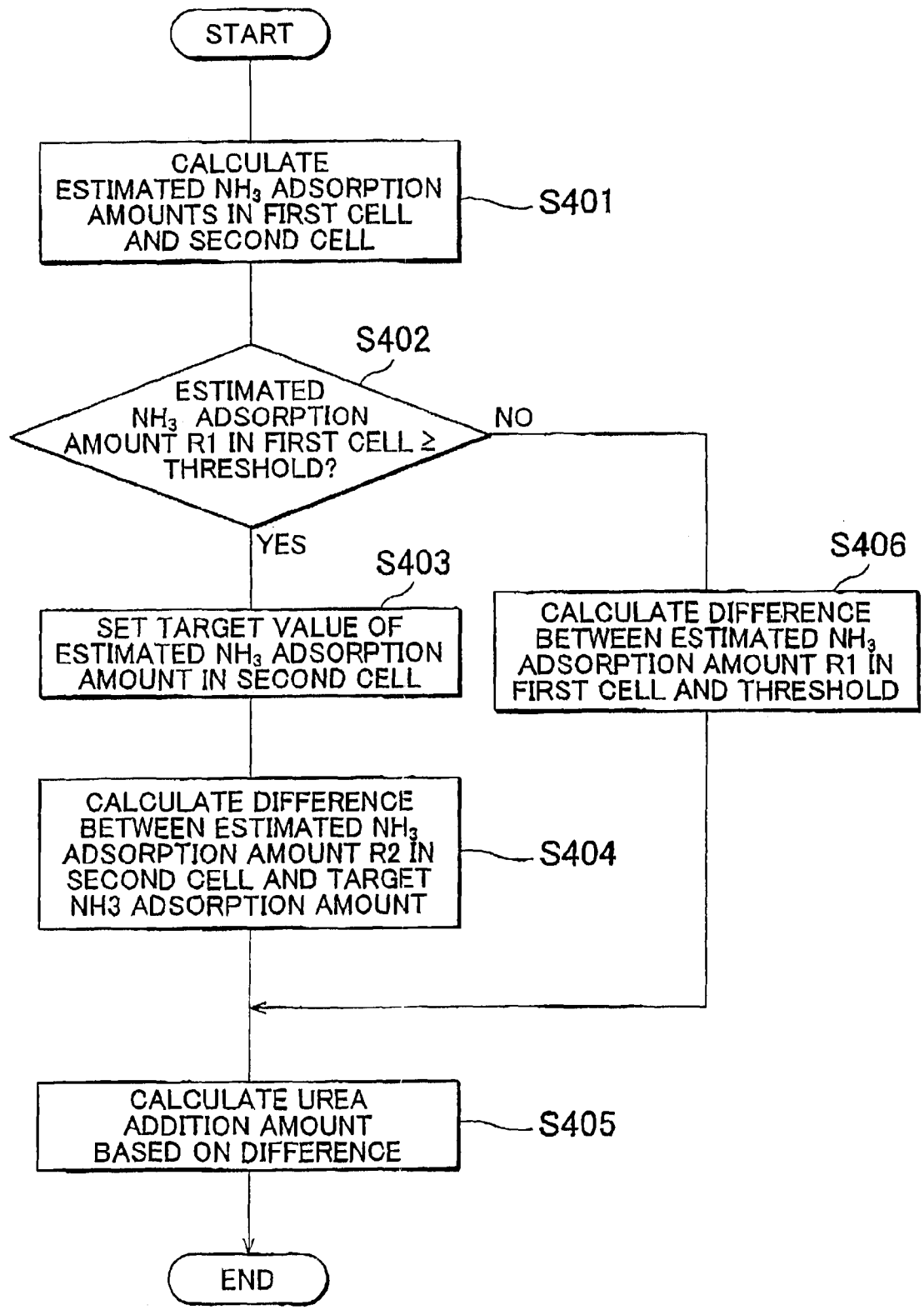
FIG. 15 is a flowchart illustrating the urea addition control according to the fourth embodiment.

FIG. 15 is a flowchart illustrating the urea addition control described above. The processing shown in this flowchart is executed repeatedly by the ECU 8.

First, in Step S401, the ECU 8 calculates the estimated ammonia adsorption amount R1 in the first cell 71 and the estimated ammonia adsorption amount R2 in the second cell 72. Here, as illustrated in the block diagram of FIG. 14, the estimated ammonia adsorption amounts R1 and R2 are calculated on the basis of the models for estimating the ammonia adsorption amounts in the first cell 71 and the second cell 72 from the temperature of the NOx reduction catalyst 7 inputted from the catalyst temperature sensor 11.

In Step S402, the ECU 8 determines whether or not the estimated ammonia adsorption amount R1 in the first cell 71 calculated in Step S401 equals or exceeds the threshold. As illustrated in the block diagram of FIG. 14, the threshold is set at a value corresponding to the temperature of the NOx reduction catalyst 7 inputted from the catalyst temperature sensor 11 on the basis of the map 54.

When the estimated ammonia adsorption amount R1 in the first cell 71 equals or exceeds the threshold, the ECU 8 advances to Step S403. When the estimated ammonia adsorption amount R1 in the first cell 71 is smaller than the threshold, on the other hand, the ECU 8 advances to Step S406 to calculate the difference between the estimated ammonia adsorption amount R1 and the threshold.

In Step S403, the ECU 8 sets the target value of the ammonia adsorption amount in the second cell. As illustrated in the block diagram of FIG. 14, the target value is set at a value corresponding to the temperature of the NOx reduction catalyst 7 inputted from the catalyst temperature sensor 11 on the basis of the map 55.

Next, in Step S404, the ECU 8 calculates the difference between the estimated ammonia adsorption amount R2 in the second cell 72 calculated in Step S401 and the target value set in Step S403.

In Step S405, the ECU 8 feedback-controls the urea addition amount on the basis of the difference calculated in Step S404 or Step S406 in order to eliminate the difference. Proportional Integrated (PI) control illustrated below in (Equation 1), for example, is applied.

$$f = K_p \times e + K_i \int e \times dt \quad (1)$$

Here, f is a feedback control amount, and e is the difference between the threshold and the estimated ammonia adsorption amount R1 in the first cell 71 calculated in Step S406 or the difference between the target value and the estimated ammonia adsorption amount R2 in the second cell 72 calculated in Step S404. Kp and Ki are a proportional gain and an integral gain of the PI control, respectively.

As shown in the flowchart, in the fourth embodiment the first control for setting the ammonia adsorption amount in the first cell 71 at or above the threshold is executed preferentially over the second control for setting the ammonia adsorption amount in the second cell 72 at the target value.

More specifically, in the first control the second control for causing the estimated ammonia adsorption amount R2 in the second cell 72 to approach the target value begins after satisfying the condition according to which the estimated ammonia adsorption amount R1 of the first cell 71 equals or exceeds the threshold (after the determination of Step S402 becomes affirmative).

In so doing, an adsorption amount distribution in which an amount of ammonia close to the saturation adsorption amount is adsorbed to the first cell 71 can be achieved quickly, and therefore a high NOx purification rate can be obtained.

Figure 16A:
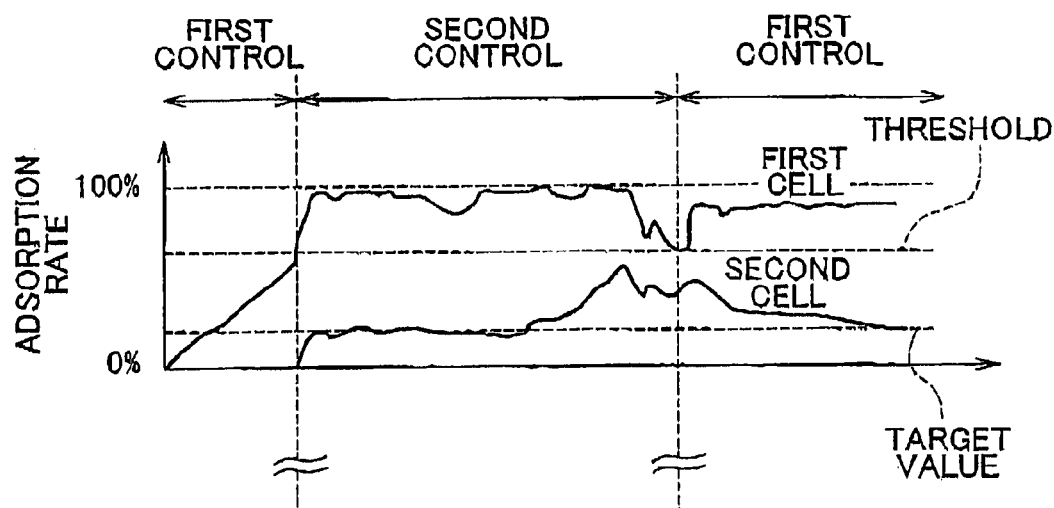
Figure 16B:
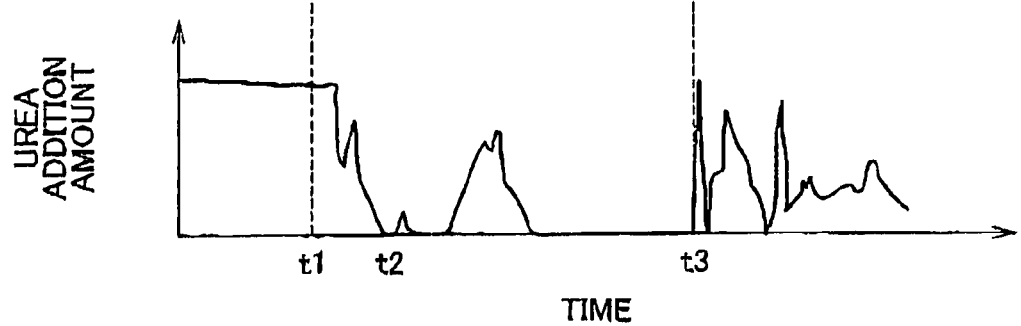

FIGS. 16A and 16B are views showing examples of temporal transitions of the ammonia adsorption rate in the first cell 71 and the second cell 72 of the NOx reduction catalyst 7 and the urea addition amount added by the urea addition valve 6 when the urea addition control according to the fourth embodiment is performed.

FIG. 16A shows the temporal transition of the ammonia adsorption rate in the first cell 71 and the second cell 72, and FIG. 16B shows the temporal transition of the urea addition amount added by the urea addition valve 6. The temporal transitions shown in FIG. 16 are temporal transitions occurring when the urea addition control according to the fourth embodiment is started from a state in which the ammonia adsorption rates of both the first cell 71 and the second cell 72 are at zero.

When the control begins, the ammonia adsorption amount in the first cell 71 is lower than the threshold, and therefore urea addition is performed according to the first control. When the ammonia adsorption amount in the first cell 71 reaches the threshold at a time t1, the ammonia adsorption amount in the second cell 72 is divergent from the target value, and therefore urea addition is performed according to the second control.

As the difference between the ammonia adsorption amount in the second cell 72 and the target value decreases, the amount of added urea is reduced, and when the ammonia adsorption amount in the second cell 72 substantially matches the target value, the urea addition amount is controlled to substantially zero (time t2). When the ammonia adsorption amount in the first cell 71 decreases below the threshold (time t3), urea addition according to the first control is resumed.

With the urea addition control according to the fourth embodiment, as described above, the urea addition amount can be feedback-controlled on the basis of the ammonia adsorption amount distribution through the NOx reduction catalyst (the ammonia adsorption amounts in the first cell and the second cell).

Hence, the ammonia adsorption amount in the first cell 71 can be controlled to or above the threshold and the ammonia adsorption amount in the second cell 72 can be controlled to the target value, and as a result, a high NOx purification rate can be obtained and ammonia slip can be suppressed favorably.

The urea addition control according to the fourth embodiment corresponds in the invention to a constitution in which the control device executes first control for controlling the purifying agent (ammonia) supplied by the purifying agent supply device (i.e. urea addition by the urea addition valve 6) so that the purifying agent adsorption amount in a predetermined first part (the first cell 71) of the exhaust gas control member (the NOx reduction catalyst 7) reaches or exceeds a predetermined threshold, and second control for controlling the purifying agent supplied by the purifying agent supply device so that the purifying agent adsorption amount in a predetermined second part (the second cell 72) of the exhaust gas control member on the downstream side of the first part in the exhaust gas flow direction reaches a predetermined target value that is smaller than the threshold.

A different method for estimating the ammonia adsorption amount distribution through the NOx reduction catalyst to the method described above in the fourth embodiment will now be described. An exhaust gas control system for an internal combustion engine constituted as shown in FIG. 17 will be used as an example in the following description.

Figure 17:
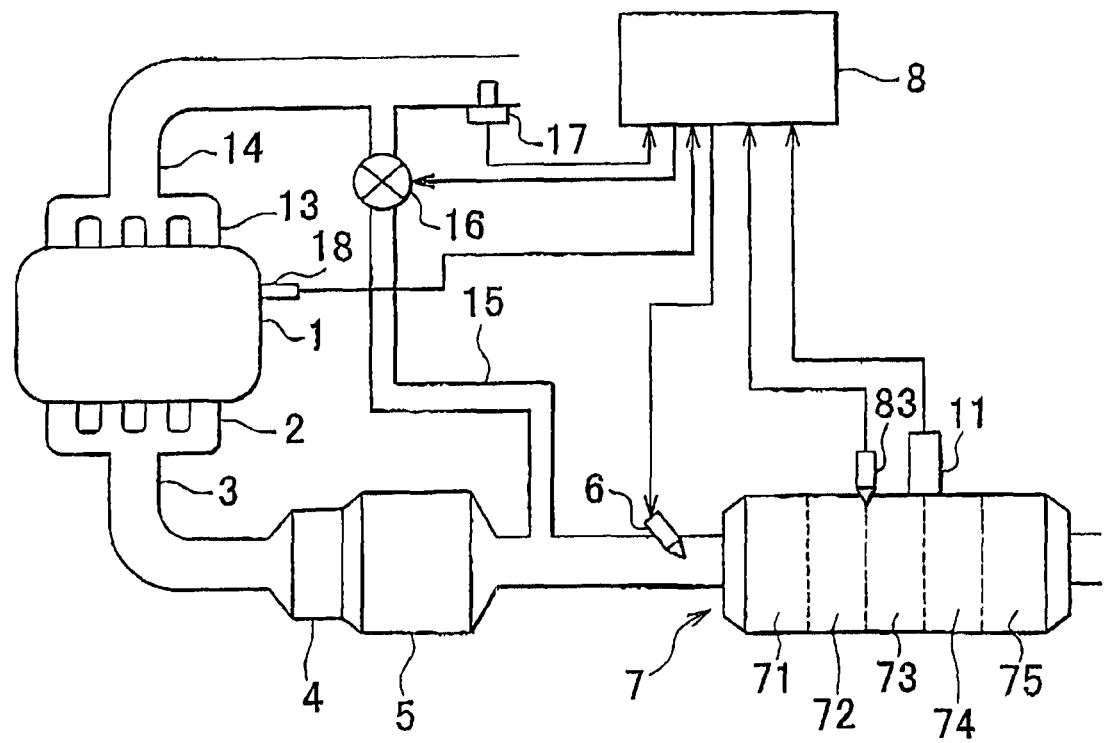
FIG. 17 is a view showing a constitutional example of a system for estimating the ammonia adsorption amount distribution through the NOx reduction catalyst using a different method to those of the above embodiments.

In the system shown in FIG. 17, the ammonia adsorption amount distribution through the NOx reduction catalyst 7 is estimated using a model obtained by dividing the NOx reduction catalyst 7 into five cells. The cell division method is similar to that of the system shown in FIG. 11. A NOx sensor 83 that detects the NOx concentration to the rear of the second cell 72 is provided in the NOx reduction catalyst 7.

The ECU 8 controls urea addition by the urea addition valve 6 on the basis of detection values from the air sensor 17, a rotation speed sensor 18, and the catalyst temperature sensor 11. All other constitutions are similar to those of the system shown in FIG. 11.

(1) First, the ECU 8 calculates the amount of ammonia flowing into the NOx reduction catalyst 7. The amount of ammonia flowing into the NOx reduction catalyst 7 is calculated on the basis of an amount of urea added to the exhaust passage 3 by the urea addition valve 6, which is obtained from the urea addition control routine executed by the ECU 8.

(2) Next, the ECU 8 calculates the amount of NOx flowing into the NOx reduction catalyst 7. The amount of NOx flowing into the NOx reduction catalyst 7 is calculated from operating conditions (load, rotation speed) of the internal combustion engine and the intake air amount detected by the air sensor 17 using a map or a relational expression.

(3) Next, the ECU 8 calculates the NOx amount consumed in a predetermined region constituted by a group of two cells, namely the first cell 71 and the second cell 72 (i.e. an amount of purified NOx). The ECU 8 determines the amount of NOx flowing out of the second cell 72 on the basis of the detection value obtained by the NOx sensor 83, calculates a difference between the amount of NOx flowing out of the second cell 72 and the amount of NOx flowing into the NOx reduction catalyst 7, obtained in (2), and calculates the amount of NOx consumed in the predetermined region on the basis of this difference.

(4) Next, the ECU 8 calculates a current ammonia adsorption amount in the predetermined region of the NOx reduction catalyst 7. The ECU 8 calculates the current ammonia adsorption amount in the predetermined region on the basis of a saturation ammonia adsorption amount in the predetermined region of the NOx reduction catalyst 7, an amount of ammonia initially adsorbed to the predetermined region, and the amount of ammonia flowing into the NOx reduction catalyst 7, obtained in (1). The saturation ammonia adsorption amount is constituted by data obtained through advance measurement and held in the form of a map or a relational expression. A value of an actual ammonia adsorption amount in the predetermined region estimated during the previous execution of the estimation routine described here is used as the initially adsorbed ammonia amount. When the initially adsorbed ammonia amount is smaller than the saturation adsorption amount, the amount of ammonia flowing newly into the predetermined region, obtained in (1), is added to the amount of ammonia adsorbed to the predetermined region. When the initially adsorbed ammonia amount has already reached the saturation adsorption amount or when the difference between the initially adsorbed ammonia amount and the saturation adsorption amount is smaller than the amount of newly inflowing ammonia obtained in (1), on the other hand, either the ammonia flowing newly into the predetermined region is not adsorbed additionally to the predetermined region, or only a part of the amount of ammonia flowing newly into the predetermined region, obtained in (1), is adsorbed additionally to the predetermined region.

(5) Next, the ECU 8 calculates the actual amount of ammonia adsorbed to the predetermined region of the NOx reduction catalyst 1. The ECU 8 calculates the actual amount of ammonia adsorbed to the predetermined region by subtracting an amount of ammonia corresponding to the amount of NOx consumed in the predetermined region of the NOx reduction catalyst 7, obtained in (3), from the current ammonia adsorption amount in the predetermined region of the NOx reduction catalyst 7, obtained in (4).

Hence, the ammonia adsorption amount in the predetermined region constituted by a group of two cells, namely the first cell 71 and the second cell 72, can be estimated using the detection value obtained by the NOx sensor 83. Furthermore, when estimating the ammonia adsorption amount in the first cell 71 and the ammonia adsorption amount in the second cell 72, a system such as that shown in FIG. 18 may be employed.

Figure 18:
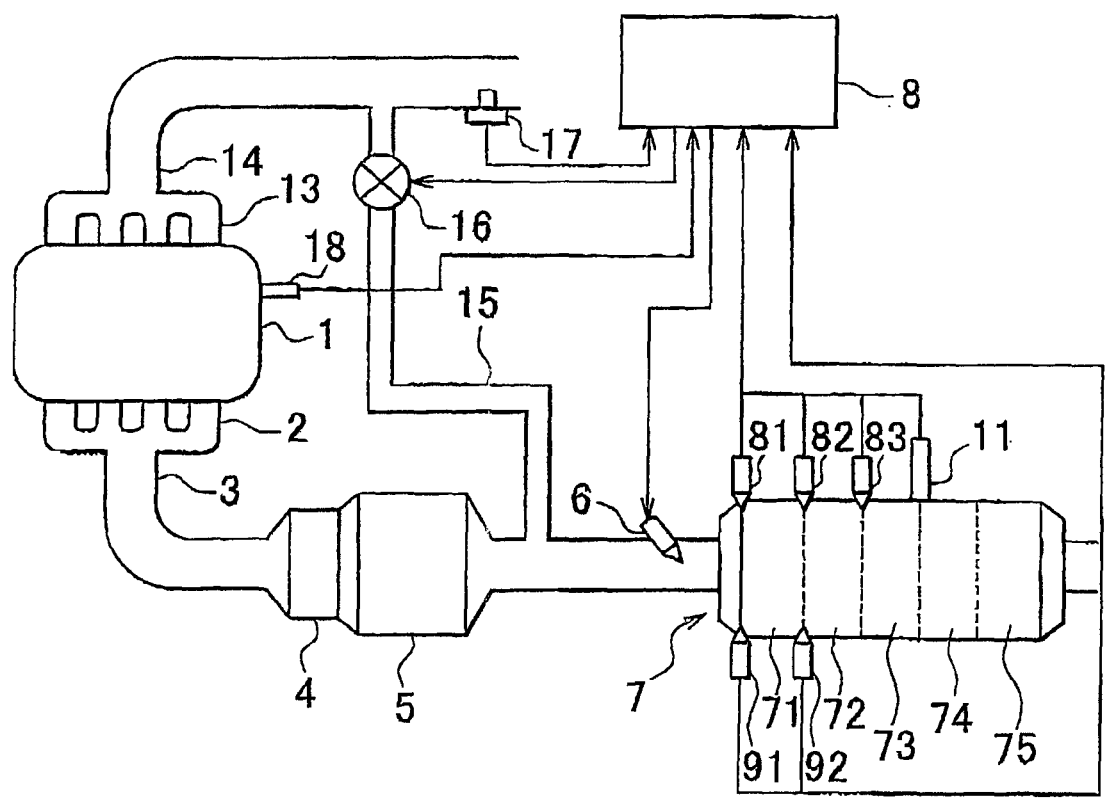
FIG. 18 is a view showing a constitutional example of a system for estimating the ammonia adsorption amount distribution through the NOx reduction, catalyst using a method that is different to those of the above embodiments and slightly different to the method shown in FIG. 17.

The system shown in FIG. 18 is formed by adding NOx sensors 81, 82 that detect the NOx concentration on either side of the first cell 71 and ammonia sensors 91, 92 that detect the ammonia concentration on either side of the first cell 71 to the system shown in FIG. 17.

In the method of estimating the ammonia adsorption amount distribution using the system shown in FIG. 11, the ammonia adsorption amount in the second cell 72 is estimated on the basis of the detection values obtained by the NOx sensors 82, 83 for detecting the NOx concentration on either side of the second cell 72 and the ammonia sensors 92, 93 for detecting the ammonia concentration on either side of the second cell 72, and using a similar estimation method, the ammonia adsorption amount in the first cell 71 may be estimated on the basis of the NOx sensors 81, 82 on either side of the first cell 71 and the ammonia sensors 91, 92 on either side of the first cell 71.

The ammonia adsorption amount in the second cell 72 can then be estimated from the ammonia adsorption amount in the first cell 71, estimated in the manner described above, and the ammonia adsorption amount in the predetermined region constituted by the first cell 71 and the second cell 72, estimated using the system shown in FIG. 17.

In the fourth embodiment, the estimated ammonia adsorption amount R1 in the first cell 71 and the estimated ammonia adsorption amount R2 in the second cell 72 may be calculated using the systems shown in FIGS. 17 and 18 instead of the ammonia adsorption amount estimating model 53 shown in FIG. 14.

The respective embodiments described above may be modified and combined within the scope of the invention. For example, in the first embodiment, an example in which the NOx reduction catalyst 7 is divided into two regions, namely the first cell 71 and the second cell 72, and urea addition is controlled in accordance with the ammonia adsorption amount in the second cell 72 was described, but the NOx reduction catalyst 7 may be divided into three or more regions.

In this case, the urea addition control is preferably performed on the basis of the ammonia adsorption amount in a furthest downstream region in consideration of the fact that the ammonia adsorption amount in the furthest downstream region has the greatest effect on the occurrence of ammonia slip.

Further, the number of divisions of the NOx reduction catalyst 7 in the ammonia adsorption amount distribution estimating model described in the fourth embodiment is not limited to five, and moreover, the respective cells may have equal or unequal widths. Furthermore, the ammonia adsorption amount distribution through the NOx reduction catalyst may be estimating by combining, within a possible range, the ammonia adsorption amount estimating model illustrated in the block diagram of FIG. 14 and the ammonia adsorption amount distribution estimating methods employed in the systems described using FIGS. 11, 17 and 18.

Further, in the respective embodiments described above, the invention is applied to an exhaust gas control apparatus having a NOx reduction catalyst that selectively reduces NOx contained in exhaust gas using ammonia as a reducing agent. However, the invention is not limited to a NOx reduction catalyst alone and may also be applied generally to an exhaust gas control apparatus that includes an exhaust gas control member having a function for controlling exhaust gas by adsorbing a purifying agent and causing the purifying agent to react with a predetermined control subject component (removal subject component) in the exhaust gas, and a control device that controls a supply of the purifying agent. The invention may also be applied generally to a method of controlling a supply of a purifying agent to an exhaust gas control member having a function for controlling exhaust gas by adsorbing the purifying agent and causing the purifying agent to react with a predetermined control subject component (removal subject component) in the exhaust gas.

The invention claimed is:

1. An exhaust gas control apparatus comprising:
   an exhaust gas control member that is provided in an exhaust system of an internal combustion engine in order to control an exhaust gas by removing a predetermined component contained in the exhaust gas, the exhaust gas control member being divided up into segments;
   a purifying agent supply device configured to supply a purifying agent to an upstream side of the exhaust gas control member in the exhaust system so that the purifying agent is adsorbed to the exhaust gas control member and the purifying agent is caused to react with the predetermined component in the exhaust gas that passes through the exhaust gas control member;
   a control device configured to obtain a purifying agent adsorption amount distribution through the exhaust gas control member and to control a purifying agent supply supplied by the purifying agent supply device on the basis of the obtained purifying agent adsorption amount distribution;
   a plurality of component amount acquisition devices, the plurality of component amount acquisition devices being located at the inlet and outlet of each segment of the exhaust gas control member, each of the plurality of component acquisition devices being configured to obtain a purifying agent adsorption amount distribution of each segment; and
   a temperature acquisition device configured to obtain a temperature of the exhaust gas control member, wherein the control device is configured to obtain the purifying agent adsorption amount distribution through the exhaust gas control member on the basis of the purifying agent adsorption amount distribution of each segment of the exhaust gas control member obtained by the plurality of component amount acquisition devices, and the temperature obtained by the temperature acquisition device.

2. The exhaust gas control apparatus according to claim 1, wherein when a purifying agent adsorption amount in a predetermined part of the exhaust gas control member on a downstream side in the exhaust gas flow direction equals or exceeds a predetermined first threshold, the control device is further configured to control the purifying agent supply device to stop the purifying agent supply or reduce a purifying agent supply amount.

3. The exhaust gas control apparatus according to claim 1, wherein the control device is further configured to:

obtain a slip determination value, the slip determination value being an index for determining a likelihood that the purifying agent flows out of the exhaust gas control member, on the basis of the purifying agent adsorption amount distribution through the exhaust gas control member, and when the slip determination value equals or exceeds a predetermined second threshold, control the purifying agent supply device to stop the purifying agent supply or reduce a purifying agent supply amount.

4. The exhaust gas control apparatus according to claim 3, wherein the control device is further configured to:

obtain a slip probability, the slip probability being an index of a likelihood that, when the purifying agent adsorbed to the exhaust gas control member desorbs from the exhaust gas control member, the desorbed purifying agent flows out of the exhaust gas control member, in each position of the exhaust gas control member, and obtain the slip determination value on the basis of the purifying agent adsorption amount distribution through the exhaust gas control member and the slip probability.

5. The exhaust gas control apparatus according to claim 3, wherein the control device is further configured to correct the slip determination value on the basis of at least one of a variation in a temperature of exhaust gas flowing into the exhaust gas control member and a variation in an operating condition of the internal combustion engine.

6. The exhaust gas control apparatus according to claim 1, wherein the control device is further configured to execute a first control and a second control, the first control controlling the purifying agent supply supplied by the purifying agent supply device so that a purifying agent adsorption amount in a first part of the exhaust gas control member reaches or exceeds a predetermined threshold, the second control controlling the purifying agent supply supplied by the purifying agent supply device so that a purifying agent adsorption amount in a second part of the exhaust gas control member reaches a predetermined target value that is equal to or smaller than the predetermined threshold.

7. The exhaust gas control apparatus according to claim 6, wherein the control device is further configured to execute the first control preferentially over the second control.

8. The exhaust gas control apparatus according to claim 6, wherein the control device is further configured to, on a model obtained by dividing the exhaust gas control member into three or more segments in the exhaust gas flow direction, set a first segment positioned furthest upstream as the first part and set a second segment positioned adjacent to the first segment on the downstream side as the second part.

9. The exhaust gas control apparatus according to claim 8, further comprising:

a component amount sensor detecting a concentration of the predetermined component flowing out of a predetermined segment in the exhaust gas control member, wherein the control device is further configured to:

estimate a purifying agent adsorption amount in a predetermined region, on the basis of the purifying agent amount supplied by the purifying agent supply device, a previously estimated purifying agent adsorption amount in a predetermined region constituted by a group of segments extending from the first segment positioned furthest upstream within the exhaust gas control member to the predetermined segment, and a purifying agent amount that can be newly adsorbed to the predetermined region;

estimate a purifying agent consumption amount in the predetermined region on the basis of a predetermined component amount flowing into the exhaust gas control member, the predetermined component amount being estimated from an operating condition of the internal combustion engine, and a predetermined component amount flowing out of the predetermined segment, the predetermined component amount being estimated from a detection value obtained by the component amount sensor; and estimate an actual purifying agent adsorption amount in the predetermined region on the basis of the estimated purifying agent adsorption amount and consumption amount in the predetermined region.

10. The exhaust gas control apparatus according to claim 8, further comprising:

a purifying agent amount sensor detecting a concentration of the purifying agent on either side of the predetermined segment in the exhaust gas control member; and a component amount sensor detecting a concentration of the predetermined component on either side of the predetermined segment, wherein the control device is further configured to:

estimate a difference between purifying agent amounts on either side of the predetermined segment on the basis of a flow rate of the exhaust gas passing through the exhaust gas control member, the flow rate being estimated from an operating condition of the internal combustion engine, and a detection value obtained by the purifying agent amount sensor;

estimate a difference between predetermined component amounts on either side of the predetermined segment on the basis of the flow rate of the exhaust gas passing through the exhaust gas control member, the flow rate being estimated from the operating condition of the internal combustion engine, and a detection value obtained by the component amount sensor;

estimate a purifying agent amount consumed in the predetermined segment and a purifying agent amount newly adsorbed to the predetermined segment on the basis of the estimated difference between the purifying agent amounts and the estimated difference between the predetermined component amounts on either side of the predetermined segment; and estimate an actual purifying agent adsorption amount in the predetermined segment on the basis of the estimated purifying agent consumption amount, the new purifying agent adsorption amount in the predetermined segment and a previously estimated purifying agent adsorption amount in the predetermined cell.

11. The exhaust gas control apparatus according to claim 1, wherein the exhaust gas control member is a NOx reduction catalyst that selectively reduces and removes NOx contained in the exhaust gas, and the purifying agent is a reducing agent that is adsorbed to the NOx reduction catalyst and performs a redox reaction with the NOx in the exhaust gas, the exhaust gas passing through the NOx reduction catalyst.

12. A control method for controlling a purifying agent supply to an upstream side of an exhaust gas control member that purifies an exhaust gas from an internal combustion engine by adsorbing a purifying agent that reacts with a predetermined component in the exhaust gas, the exhaust gas control member being divided up into segments, the method comprising:

obtaining a purifying agent adsorption amount distribution through the exhaust gas control member;

controlling the purifying agent supply on the basis of the obtained purifying agent adsorption amount distribution;

obtaining a purifying agent adsorption amount distribution of each segment of the exhaust gas control member by a plurality of component amount acquisition devices, the plurality of component amount acquisition devices being located at the inlet and outlet of each segment, each of the plurality of component acquisition devices being configured to obtain the purifying agent adsorption amount distribution of each segment of the exhaust gas control member; and obtaining a temperature of the exhaust gas control member, wherein obtaining the purifying agent adsorption amount distribution through the exhaust gas control member based on the purifying adsorption amount distribution of each segment of the exhaust gas control member obtained by the plurality of component amount acquisition devices, and the obtained temperature.

13. An exhaust gas control apparatus comprising;

an exhaust gas control member that is provided in an exhaust system of an internal combustion engine in order to control an exhaust gas by removing a predetermined component contained in the exhaust gas, the exhaust gas control member being divided up into segments;

a purifying agent supply device configured to supply a purifying agent to an upstream side of the exhaust gas control member in the exhaust system so that the purifying agent is adsorbed to the exhaust gas control member and the purifying agent is caused to react with the predetermined component in the exhaust gas that passes through the exhaust gas control member;

a control device configured to: obtain a purifying agent adsorption amount distribution through the exhaust gas control member;

control a purifying agent supply supplied by the purifying agent supply device on the basis of the obtained purifying agent adsorption amount distribution; and a plurality of component amount acquisition devices, the plurality of component amount acquisition devices being located at the inlet and outlet of each segment of the exhaust gas control member, each of the plurality of component acquisition devices being configured to obtain a purifying agent adsorption amount distribution of each segment, wherein the control device is further configured to: on a model obtained by dividing the exhaust gas control member into a plurality of segments in the exhaust gas flow direction:

obtain the purifying agent adsorption amount distribution through the exhaust gas control member on the basis of the respective detected values of each segment obtained by the plurality of component amount acquisition devices, obtain a slip probability, the slip probability being an index of a likelihood that when the purifying agent adsorbed to the exhaust gas control member desorbs from the exhaust gas control member, the desorbed purifying agent flows out of the exhaust gas control ember, in each section of the exhaust gas control member, and obtain the slip determination value on the basis of the purifying agent adsorption amount distribution through the exhaust gas control member the slip probability.

14. The exhaust gas control apparatus according to claim 13, wherein when a purifying agent adsorption amount in a predetermined part of the exhaust gas control member on a downstream side in the exhaust gas flow direction equals or exceeds a predetermined first threshold, the control device is further configured to control the purifying agent supply device to stop the purifying agent supply or reduce a purifying agent supply amount.

15. The exhaust gas control apparatus according to claim 13, wherein the control device is further configured to:

obtain a slip determination value, the slip determination value being an index for determining a likelihood that the purifying agent flows out of the exhaust gas control member, on the basis of the purifying agent adsorption amount distribution through the exhaust gas control member, and when the slip determination value equals or exceeds a predetermined second threshold, control the purifying agent supply device to stop the purifying agent supply or reduce a purifying agent supply amount.

16. The exhaust gas control apparatus according to claim 15, wherein the control device is further configured to:

obtain a slip probability, the slip probability being an index of a likelihood that, when the purifying agent adsorbed to the exhaust gas control member desorbs from the exhaust gas control member, the desorbed purifying agent flows out of the exhaust gas control member, in each segment of the exhaust gas control member, and obtain the slip determination value on the basis of the purifying agent adsorption amount distribution through the exhaust gas control member and the slip probability.

17. The exhaust gas control apparatus according to claim 13, wherein the control device is further configured to correct the slip determination value on the basis of at least one of a variation in a temperature of the exhaust gas flowing into the exhaust gas control member and a variation in an operating condition of the internal combustion engine.

18. The exhaust gas control apparatus according to claim 13, wherein the control device is further configured to execute a first control and a second control, the first control controlling the purifying agent supply supplied by the purifying agent supply device so that a purifying agent adsorption amount in a first part of the exhaust gas control member reaches or exceeds a predetermined threshold, the second control controlling the purifying agent supply supplied by the purifying agent supply device so that a purifying agent adsorption amount in a second part of the exhaust gas control member reaches a predetermined target value that is equal to or smaller than the predetermined threshold.

19. The exhaust gas control apparatus according to claim 18, wherein the control device is further configured to execute the first control preferentially over the second control.

20. The exhaust gas control apparatus according to claim 18, wherein the model is a model obtained by dividing the exhaust gas control member into three or more segments in the exhaust gas flow direction, and the control device is further configured to set a first segment as the segment of the plurality of segments positioned furthest upstream and to set a second segment as a segment of the plurality of segments positioned adjacent to the first segment on the downstream side.

21. The exhaust gas control apparatus according to claim 20, further comprising:

a component amount sensor detecting a concentration of the predetermined component flowing out of a predetermined segment in the exhaust gas control member, wherein the control device is further configured to:

estimate a purifying agent adsorption amount in a predetermined region on the basis of the purifying agent amount supplied by the purifying agent supply device, a previously estimated purifying agent adsorption amount in the predetermined region constituted by a group of segments extending from the first segment to the predetermined segment, and a purifying agent amount that can be newly adsorbed to the predetermined region;

estimate a purifying agent consumption amount in the predetermined region on the basis of a predetermined component amount flowing into the exhaust gas control member, the predetermined component amount being estimated from an operating condition of the internal combustion engine, and a predetermined component amount flowing out of the predetermined segment, the predetermined component amount being estimated from a detection value obtained by the component amount sensor; and estimate an actual purifying agent adsorption amount in the predetermined region on the basis of the estimated purifying agent adsorption amount and the estimated purifying agent consumption amount in the predetermined region.

22. The exhaust gas control apparatus according to claim 20, further comprising:

a purifying agent amount sensor detecting a concentration of the purifying agent on either side of the predetermined segment in the exhaust gas control member; and a component amount sensor detecting a concentration of the predetermined component on either side of the predetermined segment, wherein the control device is further configured to:

estimate a difference between purifying agent amounts on either side of the predetermined segment on the basis of a flow rate of the exhaust gas passing through the exhaust gas control member, estimated from an operating condition of the internal combustion engine, and a detection value obtained by the purifying agent amount sensor;

estimate a difference between predetermined component amounts on either side of the predetermined segment on the basis of the flow rate of the exhaust gas passing through the exhaust gas control member, estimated from the operating condition of the internal combustion engine, and a detection value obtained by the component amount sensor;

estimate a purifying agent amount consumed in the predetermined segment and a purifying agent amount newly adsorbed to the predetermined segment on the basis of the estimated difference between the purifying agent amounts and the estimated difference between the predetermined component amounts on either side of the predetermined segment; and estimate an actual purifying agent adsorption amount in the predetermined segment on the basis of the estimated purifying agent consumption amount, the new adsorption amount in the predetermined segment and a previously estimated purifying agent adsorption amount in the predetermined segment.

23. The exhaust gas control apparatus according to claim 13, wherein the exhaust gas control member is a NOx reduction catalyst that selectively reduces and removes NOx contained in the exhaust gas, and the purifying agent is a reducing agent that is adsorbed to the NOx reduction catalyst and performs a redox reaction with the NOx in the exhaust gas, the exhaust gas passing through the NOx reduction catalyst.

24. A control method for controlling a purifying agent supply to an upstream side of an exhaust gas control member that purifies an exhaust gas from an internal combustion engine by adsorbing a purifying agent that reacts with a predetermined component in the exhaust gas, the exhaust gas control member being divided up into segments, the method comprising:

obtaining a purifying agent adsorption amount distribution through the exhaust gas control member;

controlling the purifying agent supply on the basis of the obtained purifying agent adsorption amount distribution; and on a model obtained by dividing the exhaust gas control member into a plurality of segments in the exhaust gas flow direction:

obtaining the purifying agent adsorption amount distribution through the exhaust gas control member on the basis of respective detected values of each segment obtained by a plurality of component amount acquisition devices, the plurality of component amount acquisition devices being located at the inlet and outlet of each segment of the exhaust gas control member, each of the plurality of component acquisition devices being configured to obtain a purifying agent adsorption amount distribution of each segment, obtaining a slip probability, the slip probability being an index of a likelihood that when the purifying agent adsorbed to the exhaust gas control member desorbs from the exhaust gas control member, the desorbed purifying agent flows out of the exhaust gas control member, in each section of the exhaust gas control member, and obtaining the slip determination value on the basis of the purifying agent adsorption amount distribution through the exhaust gas control member and the slip probability.

* * * * *